US008959137B1

(12) United States Patent
Langhammer

(10) Patent No.: US 8,959,137 B1
(45) Date of Patent: Feb. 17, 2015

(54) IMPLEMENTING LARGE MULTIPLIERS IN A PROGRAMMABLE INTEGRATED CIRCUIT DEVICE

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 188 days.

(21) Appl. No.: 13/677,924

(22) Filed: Nov. 15, 2012

Related U.S. Application Data

(63) Continuation-in-part of application No. 13/545,263, filed on Jul. 10, 2012, which is a continuation of application No. 12/034,146, filed on Feb. 20, 2008, now abandoned.

(51) Int. Cl.
*G06F 7/52* (2006.01)
*G06F 7/62* (2006.01)

(52) U.S. Cl.
CPC ........................................ *G06F 7/62* (2013.01)
USPC .......................................... 708/620; 708/622

(58) Field of Classification Search
USPC .................. 708/501, 503, 523, 620, 625–632
See application file for complete search history.

(56) References Cited

U.S. PATENT DOCUMENTS

| | | | |
|---|---|---|---|
| 3,473,160 A | 10/1969 | Wahlstrom | |
| 3,800,130 A | 3/1974 | Martinson et al. | |
| 3,814,924 A | 6/1974 | Tate | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |

(Continued)

FOREIGN PATENT DOCUMENTS

| | | |
|---|---|---|
| EP | 0 158 430 | 10/1985 |
| EP | 0 326 415 | 8/1989 |

(Continued)

OTHER PUBLICATIONS

Altera, "Implementing Multipliers in FPGA Devices," Application Note 306, ver. 3.0, Jul. 2004.*

(Continued)

*Primary Examiner* — Chuong D Ngo
*Assistant Examiner* — Matthew Sandifer
(74) *Attorney, Agent, or Firm* — Ropes & Gray LLP; Jeffrey H. Ingerman

(57) ABSTRACT

A specialized processing block is configurable as one ternary linear decomposition or two binary linear decompositions to perform large multiplications using smaller multipliers, and includes a first number of multiplier circuits of a first size, a second number of pre-adders, and a third number of block inputs. The block inputs are connected to a first subset of the multiplier circuits, and to the pre-adders which are connected to a second subset of the multiplier circuits. There is also a fourth number of additional inputs. A plurality of shifters shift partial product outputs of each of the multipliers by various shift amounts. A joint adder structure combines the shifted partial products. Controllable elements controllably select between different configurations of inputs to the multipliers and pre-adders, controllably connect and disconnect certain ones of the shifted partial products, and selectively split the joint adder structure into two smaller adder structures.

21 Claims, 11 Drawing Sheets

(56) References Cited

U.S. PATENT DOCUMENTS

| | | | |
|---|---|---|---|
| 4,422,155 | A | 12/1983 | Amir et al. |
| 4,484,259 | A | 11/1984 | Palmer et al. |
| 4,521,907 | A | 6/1985 | Amir et al. |
| 4,575,812 | A | 3/1986 | Kloker et al. |
| 4,597,053 | A | 6/1986 | Chamberlin |
| 4,616,330 | A | 10/1986 | Betz |
| 4,623,961 | A | 11/1986 | Mackiewicz |
| 4,682,302 | A | 7/1987 | Williams |
| 4,718,057 | A | 1/1988 | Venkitakrishnan et al. |
| 4,727,508 | A | 2/1988 | Williams |
| 4,736,335 | A | 4/1988 | Barkan |
| 4,754,421 | A | 6/1988 | Bosshart |
| 4,791,590 | A | 12/1988 | Ku et al. |
| 4,799,004 | A | 1/1989 | Mori |
| 4,823,295 | A | 4/1989 | Mader |
| 4,839,847 | A | 6/1989 | Laprade |
| 4,871,930 | A | 10/1989 | Wong et al. |
| 4,908,788 | A | 3/1990 | Fujiyama |
| 4,912,345 | A | 3/1990 | Steele et al. |
| 4,918,637 | A | 4/1990 | Morton |
| 4,967,160 | A | 10/1990 | Quievy et al. |
| 4,982,354 | A | 1/1991 | Takeuchi et al. |
| 4,991,010 | A | 2/1991 | Hailey et al. |
| 4,994,997 | A | 2/1991 | Martin et al. |
| 4,999,803 | A | 3/1991 | Turrini et al. |
| 5,068,813 | A | 11/1991 | Thoen |
| 5,073,863 | A | 12/1991 | Zhang |
| 5,081,604 | A | 1/1992 | Tanaka |
| 5,122,685 | A | 6/1992 | Chan et al. |
| 5,128,559 | A | 7/1992 | Steele |
| 5,175,702 | A | 12/1992 | Beraud et al. |
| 5,208,491 | A | 5/1993 | Ebeling et al. |
| RE34,363 | E | 8/1993 | Freeman |
| 5,267,187 | A | 11/1993 | Hsieh et al. |
| 5,296,759 | A | 3/1994 | Sutherland et al. |
| 5,338,983 | A | 8/1994 | Agarwala |
| 5,339,263 | A | 8/1994 | White |
| 5,349,250 | A | 9/1994 | New |
| 5,357,152 | A | 10/1994 | Jennings, III et al. |
| 5,371,422 | A | 12/1994 | Patel et al. |
| 5,373,461 | A | 12/1994 | Bearden et al. |
| 5,375,079 | A | 12/1994 | Uramoto et al. |
| 5,381,357 | A | 1/1995 | Wedgwood et al. |
| 5,404,324 | A | 4/1995 | Colon-Bonet |
| 5,424,589 | A | 6/1995 | Dobbelaere et al. |
| 5,446,651 | A | 8/1995 | Moyse et al. |
| 5,451,948 | A | 9/1995 | Jekel |
| 5,452,231 | A | 9/1995 | Butts et al. |
| 5,452,375 | A | 9/1995 | Rousseau et al. |
| 5,457,644 | A | 10/1995 | McCollum |
| 5,465,226 | A | 11/1995 | Goto |
| 5,465,375 | A | 11/1995 | Thepaut et al. |
| 5,483,178 | A | 1/1996 | Costello et al. |
| 5,497,498 | A | 3/1996 | Taylor |
| 5,500,812 | A | 3/1996 | Saishi et al. |
| 5,500,828 | A | 3/1996 | Doddington et al. |
| 5,523,963 | A | 6/1996 | Hsieh et al. |
| 5,528,550 | A | 6/1996 | Pawate et al. |
| 5,537,601 | A | 7/1996 | Kimura et al. |
| 5,541,864 | A | 7/1996 | Van Bavel et al. |
| 5,546,018 | A | 8/1996 | New et al. |
| 5,550,993 | A | 8/1996 | Ehlig et al. |
| 5,559,450 | A | 9/1996 | Ngai et al. |
| 5,563,526 | A | 10/1996 | Hastings et al. |
| 5,563,819 | A | 10/1996 | Nelson |
| 5,570,039 | A | 10/1996 | Oswald et al. |
| 5,570,040 | A | 10/1996 | Lytle et al. |
| 5,572,148 | A | 11/1996 | Lytle et al. |
| 5,581,501 | A | 12/1996 | Sansbury et al. |
| 5,590,350 | A | 12/1996 | Guttag et al. |
| 5,594,366 | A | 1/1997 | Khong et al. |
| 5,594,912 | A | 1/1997 | Brueckmann et al. |
| 5,596,763 | A | 1/1997 | Guttag et al. |
| 5,606,266 | A | 2/1997 | Pedersen |
| 5,617,058 | A | 4/1997 | Adrian et al. |
| 5,631,848 | A | 5/1997 | Laczko et al. |
| 5,633,601 | A | 5/1997 | Nagaraj |
| 5,636,150 | A | 6/1997 | Okamoto |
| 5,636,368 | A | 6/1997 | Harrison et al. |
| 5,640,578 | A | 6/1997 | Balmer et al. |
| 5,644,519 | A | 7/1997 | Yatim et al. |
| 5,644,522 | A | 7/1997 | Moyse et al. |
| 5,646,545 | A | 7/1997 | Trimberger et al. |
| 5,646,875 | A | 7/1997 | Taborn et al. |
| 5,648,732 | A | 7/1997 | Duncan |
| 5,652,903 | A | 7/1997 | Weng et al. |
| 5,655,069 | A | 8/1997 | Ogawara et al. |
| 5,664,192 | A | 9/1997 | Lloyd et al. |
| 5,689,195 | A | 11/1997 | Cliff et al. |
| 5,696,708 | A | 12/1997 | Leung |
| 5,729,495 | A | 3/1998 | Madurawe |
| 5,740,404 | A | 4/1998 | Baji |
| 5,744,980 | A | 4/1998 | McGowan et al. |
| 5,744,991 | A | 4/1998 | Jefferson et al. |
| 5,754,459 | A | 5/1998 | Telikepalli |
| 5,761,483 | A | 6/1998 | Trimberger |
| 5,764,555 | A | 6/1998 | McPherson et al. |
| 5,768,613 | A | 6/1998 | Asghar |
| 5,771,186 | A | 6/1998 | Kodali et al. |
| 5,777,912 | A | 7/1998 | Leung et al. |
| 5,784,636 | A | 7/1998 | Rupp |
| 5,790,446 | A | 8/1998 | Yu et al. |
| 5,794,067 | A | 8/1998 | Kadowaki |
| 5,801,546 | A | 9/1998 | Pierce et al. |
| 5,805,477 | A | 9/1998 | Perner |
| 5,805,913 | A | 9/1998 | Guttag et al. |
| 5,808,926 | A | 9/1998 | Gorshtein et al. |
| 5,812,479 | A | 9/1998 | Cliff et al. |
| 5,812,562 | A | 9/1998 | Baeg |
| 5,815,422 | A | 9/1998 | Dockser |
| 5,821,776 | A | 10/1998 | McGowan |
| 5,825,202 | A | 10/1998 | Tavana et al. |
| 5,835,393 | A * | 11/1998 | Melanson et al. ............ 708/628 |
| 5,838,165 | A | 11/1998 | Chatter |
| 5,841,684 | A | 11/1998 | Dockser |
| 5,847,579 | A | 12/1998 | Trimberger |
| 5,847,978 | A | 12/1998 | Ogura et al. |
| 5,847,981 | A | 12/1998 | Kelley et al. |
| 5,859,878 | A | 1/1999 | Phillips et al. |
| 5,869,979 | A | 2/1999 | Bocchino |
| 5,872,380 | A | 2/1999 | Rostoker et al. |
| 5,874,834 | A | 2/1999 | New |
| 5,878,250 | A | 3/1999 | LeBlanc |
| 5,880,981 | A | 3/1999 | Kojima et al. |
| 5,892,962 | A | 4/1999 | Cloutier |
| 5,894,228 | A | 4/1999 | Reddy et al. |
| 5,898,602 | A | 4/1999 | Rothman et al. |
| 5,931,898 | A | 8/1999 | Khoury |
| 5,942,914 | A | 8/1999 | Reddy et al. |
| 5,944,774 | A | 8/1999 | Dent |
| 5,949,710 | A | 9/1999 | Pass et al. |
| 5,951,673 | A | 9/1999 | Miyata |
| 5,956,265 | A | 9/1999 | Lewis |
| 5,959,871 | A | 9/1999 | Pierzchala et al. |
| 5,960,193 | A | 9/1999 | Guttag et al. |
| 5,961,635 | A | 10/1999 | Guttag et al. |
| 5,963,048 | A | 10/1999 | Harrison et al. |
| 5,963,050 | A | 10/1999 | Young et al. |
| 5,968,196 | A | 10/1999 | Ramamurthy et al. |
| 5,970,254 | A | 10/1999 | Cooke et al. |
| 5,978,260 | A | 11/1999 | Trimberger et al. |
| 5,982,195 | A | 11/1999 | Cliff et al. |
| 5,986,465 | A | 11/1999 | Mendel |
| 5,991,788 | A | 11/1999 | Mintzer |
| 5,991,898 | A | 11/1999 | Rajski et al. |
| 5,995,748 | A | 11/1999 | Guttag et al. |
| 5,999,015 | A | 12/1999 | Cliff et al. |
| 5,999,990 | A | 12/1999 | Sharrit et al. |
| 6,005,806 | A | 12/1999 | Madurawe et al. |
| 6,006,321 | A | 12/1999 | Abbott |
| 6,009,451 | A | 12/1999 | Burns |
| 6,018,755 | A | 1/2000 | Gonikberg et al. |
| 6,020,759 | A | 2/2000 | Heile |
| 6,021,423 | A | 2/2000 | Nag et al. |

(56) References Cited

U.S. PATENT DOCUMENTS

| | | | |
|---|---|---|---|
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,052,773 A | 4/2000 | DeHon et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,346,824 B1 | 2/2002 | New |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,578,060 B2 | 6/2003 | Chen et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,806,733 B1 | 10/2004 | Pan et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,917,955 B1 | 7/2005 | Botchev |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,024,446 B2 | 4/2006 | Langhammer et al. |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,200,631 B2 | 4/2007 | Mailaender et al. |
| 7,230,451 B1 * | 6/2007 | Langhammer .................. 326/41 |
| 7,287,051 B1 * | 10/2007 | Langhammer ................ 708/490 |
| 7,313,585 B2 | 12/2007 | Winterrowd |
| 7,343,388 B1 | 3/2008 | Burney et al. |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,720,898 B2 | 5/2010 | Driker et al. |
| 7,769,797 B2 | 8/2010 | Cho et al. |
| 7,814,137 B1 * | 10/2010 | Mauer ........................... 708/300 |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,917,567 B1 | 3/2011 | Mason et al. |
| 7,930,335 B2 | 4/2011 | Gura |
| 7,930,336 B2 | 4/2011 | Langhammer et al. |
| 7,930,337 B2 * | 4/2011 | Hasenplaugh et al. ....... 708/625 |
| 7,949,699 B1 | 5/2011 | Neoh et al. |
| 7,974,997 B2 | 7/2011 | Arviv et al. |

(56) References Cited

U.S. PATENT DOCUMENTS

| | | | | |
|---|---|---|---|---|
| 8,041,759 | B1* | 10/2011 | Langhammer et al. | 708/523 |
| 8,090,758 | B1* | 1/2012 | Shimanek et al. | 708/523 |
| 8,112,466 | B2 | 2/2012 | Minz et al. | |
| 8,301,681 | B1 | 10/2012 | Lee et al. | |
| 8,468,192 | B1* | 6/2013 | Langhammer | 708/620 |
| 2001/0023425 | A1 | 9/2001 | Oberman et al. | |
| 2001/0029515 | A1 | 10/2001 | Mirsky | |
| 2001/0037351 | A1 | 11/2001 | Hellberg | |
| 2001/0037352 | A1 | 11/2001 | Hong | |
| 2002/0002573 | A1 | 1/2002 | Landers et al. | |
| 2002/0032713 | A1 | 3/2002 | Jou et al. | |
| 2002/0038324 | A1 | 3/2002 | Page et al. | |
| 2002/0049798 | A1 | 4/2002 | Wang et al. | |
| 2002/0078114 | A1 | 6/2002 | Wang et al. | |
| 2002/0089348 | A1 | 7/2002 | Langhammer | |
| 2002/0116434 | A1 | 8/2002 | Nancekievill | |
| 2002/0129073 | A1 | 9/2002 | Page et al. | |
| 2003/0088757 | A1 | 5/2003 | Lindner et al. | |
| 2004/0064770 | A1 | 4/2004 | Xin | |
| 2004/0083412 | A1 | 4/2004 | Corbin et al. | |
| 2004/0103133 | A1 | 5/2004 | Gurney | |
| 2004/0122882 | A1 | 6/2004 | Zakharov et al. | |
| 2004/0148321 | A1 | 7/2004 | Guevorkian et al. | |
| 2004/0172439 | A1 | 9/2004 | Lin | |
| 2004/0178818 | A1 | 9/2004 | Crotty et al. | |
| 2004/0193981 | A1 | 9/2004 | Clark et al. | |
| 2004/0267857 | A1 | 12/2004 | Abel et al. | |
| 2004/0267863 | A1 | 12/2004 | Bhushan et al. | |
| 2005/0038842 | A1 | 2/2005 | Stoye | |
| 2005/0120122 | A1 | 6/2005 | Farnham | |
| 2005/0144212 | A1 | 6/2005 | Simkins et al. | |
| 2005/0144215 | A1 | 6/2005 | Simkins et al. | |
| 2005/0144216 | A1 | 6/2005 | Simkins et al. | |
| 2005/0166038 | A1 | 7/2005 | Wang et al. | |
| 2005/0187997 | A1 | 8/2005 | Zheng et al. | |
| 2005/0187999 | A1 | 8/2005 | Zheng et al. | |
| 2005/0262175 | A1 | 11/2005 | Iino et al. | |
| 2006/0020655 | A1 | 1/2006 | Lin | |
| 2006/0112160 | A1 | 5/2006 | Ishii et al. | |
| 2006/0230095 | A1* | 10/2006 | Simkins et al. | 708/700 |
| 2007/0083585 | A1* | 4/2007 | St Denis et al. | 708/492 |
| 2007/0185951 | A1 | 8/2007 | Lee et al. | |
| 2007/0185952 | A1 | 8/2007 | Langhammer et al. | |
| 2007/0226287 | A1 | 9/2007 | Lin et al. | |
| 2007/0241773 | A1 | 10/2007 | Hutchings et al. | |
| 2008/0133627 | A1 | 6/2008 | Langhammer et al. | |
| 2008/0159441 | A1 | 7/2008 | Liao et al. | |
| 2008/0183783 | A1 | 7/2008 | Tubbs | |
| 2009/0028455 | A1 | 1/2009 | Nakamura et al. | |
| 2009/0083358 | A1 | 3/2009 | Allen | |
| 2009/0113186 | A1 | 4/2009 | Kato et al. | |
| 2009/0172052 | A1 | 7/2009 | DeLaquil et al. | |
| 2009/0187615 | A1 | 7/2009 | Abe et al. | |
| 2009/0228689 | A1 | 9/2009 | Muff et al. | |
| 2009/0300088 | A1 | 12/2009 | Michaels et al. | |
| 2010/0098189 | A1 | 4/2010 | Oketani | |
| 2010/0146022 | A1 | 6/2010 | Swartzlander et al. | |
| 2010/0191786 | A1* | 7/2010 | Simkins et al. | 708/209 |
| 2010/0191939 | A1 | 7/2010 | Muff et al. | |
| 2010/0228806 | A1* | 9/2010 | Streicher et al. | 708/203 |
| 2011/0161389 | A1 | 6/2011 | Langhammer et al. | |
| 2011/0219052 | A1 | 9/2011 | Langhammer | |
| 2011/0238720 | A1 | 9/2011 | Langhammer | |
| 2011/0320513 | A1 | 12/2011 | Langhammer | |
| 2012/0054254 | A1 | 3/2012 | Langhammer | |
| 2012/0054256 | A1 | 3/2012 | Langhammer | |
| 2012/0166512 | A1 | 6/2012 | Wong et al. | |

FOREIGN PATENT DOCUMENTS

| | | |
|---|---|---|
| EP | 0 380 456 | 8/1990 |
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-219279 | 8/1999 |
| JP | 11-296345 | 10/1999 |
| JP | 2000-259394 | 9/2000 |
| JP | 2000-353077 | 12/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO 97/08610 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO 2005/101190 | 10/2005 |
| WO | WO 2010/102007 | 9/2010 |

OTHER PUBLICATIONS

Altera, "DSP Blocks in Stratix III Devices", Chapter 5, pp. 1-42, Mar. 2010.

Altera Corporation, "Statix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices." *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3 11 through 3 15 (Oct. 2005).

Altera Corporation, "Advanced Synthesis Cookbook: A Design Guide for Stratix II, Stratix III and Stratix IV Devices," Document Version 3.0, 112 pgs., May 2008.

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

(56) References Cited

OTHER PUBLICATIONS

Ashour, M.A., et al., "An FPGA implementation guide for some different types of serial-parallel multiplier-structures," *Microelectronics Journal*, vol. 31, No. 3, 2000, pp. 161-168.

Berg, B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, P., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings—Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

deDinechin, F. et al., "Large multipliers with less DSP blocks," retrieved from http://hal-ens-lyon.archives-ouvertes.fr/ensl-00356421/en/, 9 pgs., available online Jan. 2009.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Farooqui, A., et al., "General Data-Path Organization of a MAC unit for VLSI Implementation of DSP Processors," ISCAS '98, Part 2, May 31, 1998-Jun. 3, 1998, pp. 260-263.

Gaffer, A.A., et al., "Floating-Point Bitwidth Analysis via Automatic Differentiation," *IEEE Conference on Field Programmable Technology*, Hong Kong, Dec. 2002.

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)* Jun. 2005.

Govindu, G. et al., "Analysis of High-performance Floating-point Arithmetic on FPGAs," *Proceedings of the 18$^{th}$ International Parallel and Distributed Processing Symposium (PDPS'04)*, pp. 149-156, Apr. 2004.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Haynes, S.D., et al., "Configurable multiplier blocks for embedding in FPGAs," *Electronicas Letters* vol. 34, No. 7, pp. 638-639 (Apr. 2, 1998).

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings* (IEEE Cat. No. 96TH8140), Oct. 21-24, 1996, pp. 275-279.

Jones, G., "Field-programmable digital signal conditioning," *Electronic Product Design*, vol. 21, No. 6, Jun. 2000, pp. C36-C38.

Karlstrom, K., et al., "High Performance, Low Latency FPGA based Floating Point Adder and Multiplier Units in a Virtex 4," Norchip Conf., pp. 31-34, 2006.

Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Kramberger, I., "DSP acceleration using a reconfigurable FPGA," *ISIE '99. Proceedings of the IEEE International Symposium on Industrial Electronics* (Cat. No. 99TH8465), vol. 3, Jul. 12-16, 1999, pp. 1522-1525.

Langhammer, M., "How to implement DSP in programmable logic," *Elettronica Oggi*, No. 266, Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Martinson, L. et al., "Digital matched Filtering with Pipelined Floating Point Fast Fourier Transforms (FFT's)" *IEEE Transactions on Acoustics, Speech, and Signal Processing*, vol. ASSP-23, No. 2, pp. 222-234, Apr. 1975.

Miller, N.L., et al., "Reconfigurable integrated circuit for high performance computer arithmetic," *Proceedings of the 1998 IEE Colloquium on Evolvable Hardware Systems (Digest)* No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Nedjah, N., et al., "Fast Less Recursive Hardware for Large Number Multiplication Using Karatsuba-Ofman's Algorithm," *Computer and Information Sciences—ISCIS*, pp. 43-50, 2003.

Nozal, L., et al., "A new vision system: programmable logic devices and digital signal processor architecture (PKD+FDSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.

Osana, Y., et al., "Hardware-resource Utilization Analysis on an FPGA-Based Biochemical Simulator ReCSiP" *The Institute of Electronics Information and Communication Technical Report CPSY2005-63*, vol. 105, No. 516, Jan. 18, 2006.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

(56) References Cited

OTHER PUBLICATIONS

Parhami, B., "Configurable arithmetic arrays with data-driven control," *34th Asilomar Conference on Signals, Systems and Computers*, vol. 1, 2000, pp. 89-93.
"The QuickDSP Design Guide", Quicklogic, Aug. 2001, revision B.
"QuickDSP™ Family Data Sheet", *Quicklogic*, Aug. 7, 2001, revision B.
Rangasayee, K., "Complex PLDs let you produce efficient arithmetic designs," *EDN (European Edition)*, vol. 41, No. 13, Jun. 20, 1996, pp. 109, 110, 112, 114, 116.
Rosado, A., et al., "A high-speed multiplier coprocessor unit based on FPGA," *Journal of Electrical Engineering*, vol. 48, No. 11-12, 1997, pp. 298-302.
Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.
Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.
Thapliyal, H., et al., "Combined Integer and Floating Point Multiplication Architecture (CIFM) for FPGSs and Its Reversible Logic Implementation", *Proceedings MWSCAS 2006*, Puerto Rico, 5 pages, Aug. 2006.
Thapliyal, H., et al., "Combined Integer and Variable Precision (CIVP) Floating Point Multiplication Architecture for FPGAs", *Proceedings of the 2007 International Conference on Parallel and Distributed Processing Techniques and Applications (PDPTA'07)*, Las Vegas, US, vol. 1, pp. 449-450, Jun. 2007.
Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.
Tralka, C., "Symbiosis of DSP and PLD," *Elektronik*, vol. 49, No. 14, Jul. 11, 2000, pp. 84-96.
Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.
Valls, J., et al., "A Study About FPGA-Based Digital Filters," *Signal Processing Systems*, 1998, SIPS 98, 1998 IEEE Workshop, Oct. 10, 1998, pp. 192-201.
"Virtex-II 1.5V Field-Programmable Gate Arrays", *Xilinx*, Jan. 25, 2001, module 2 of 4.
"Virtex-II 1.5V Field-Programmable Gate Arrays", *Xilinx*, Apr. 2, 2001, module 1 of 4.
"Virtex-II 1.5V Field-Programmable Gate Arrays", *Xilinx*, Apr. 2, 2001, module 2 of 4.
Vladimirova, T. et al., "Floating-Point Mathematical Co-Processor for a Single-Chip On-Board Computer," *MAPLD'03 Conference, D5*, Sep. 2003.
Wajih, E.-H.Y. et al., "Efficient Hardware Architecture of Recursive Karatsuba-Ofman Multiplier," *3$^{rd}$ International Conference on Design and Technology of Integrated Systems in Nanoscale Era*, 6 pgs, Mar. 2008.
Walters, A.L., "A Scaleable FIR Filter Implementation Using 32-bit Floating-Point Complex Arithmetic on, a FPGA Based Custom Computing Platform," Allison L. Walters, Thesis Submitted to the Faculty of Virginia Polytechnic Institute and State University, Jan. 30, 1998.
Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.
Wenzel, L., "Field programmable gate arrays (FPGAs) to replace digital signal processor integrated circuits," *Elektronik*, vol. 49, No. 5, Mar. 7, 2000, pp. 78-86.
"Xilinx Unveils New FPGA Architecture to Enable High-Performance, 10 Million System Gate Designs", *Xilinx*, Jun. 22, 2000.
"Xilinx Announces DSP Algorithms, Tools and Features for Virtex-II Architecture", *Xilinx*, Nov. 21, 2000.
Xilinx Inc., "Virtex-II 1.5V Field-Programmable Gate Arrays", Advance Product Specification, DS031-2 (v1.9), Nov. 29, 2001, Module 2 of 4, pp. 1-39.
Xilinx Inc., "Using Embedded Multipliers", Virtex-II Platform FPGA Handbook, UG002 (v1.3), Dec. 3, 2001, pp. 251-257.
Xilinx, Inc., "A 1D Systolic FIR," copyright 1994-2002, downloaded from http:--www.iro.umontreal.ca-~aboulham-F6221-Xilinx%20A%201D%20systolic%20FIR.htm.
Xilinx, Inc., "The Future of FPGA's," White Paper, available Nov. 14, 2005 for download from http:--www.xilinx.com-prs_rls,5yrwhite.htm.
Xilinx Inc., "XtremeDSP Design Considerations User Guide," v 1.2, Feb. 4, 2005.
Xilinx Inc., "Complex Multiplier v2.0", DS291 Product Specification/Datasheet, Nov. 2004.
Xilinx, Inc., "Virtex-5 ExtremeDSP Design Considerations," *User Guide UG193*, v2.6, 114 pages, Oct. 2007.
Zhou, G. et al., "Efficient and High-Throughput Implementations of AES-GCM on FPGAs," *International Conference on Field-Programmable Technology*, 8 pgs., Dec. 2007.

\* cited by examiner

IMPLEMENTING LARGE MULTIPLIERS IN A PROGRAMMABLE INTEGRATED CIRCUIT DEVICE

CROSS REFERENCE TO RELATED APPLICATION

This is a continuation-in-part of copending, commonly-assigned U.S. patent application Ser. No. 13/545,263, filed Jul. 10, 2012, which is a continuation of commonly-assigned U.S. patent application Ser. No. 12/034,146, filed Feb. 20, 2008, now abandoned, each of which is hereby incorporated by reference herein in its respective entirety.

BACKGROUND OF THE INVENTION

This invention relates to implementing large multiplication operations in programmable integrated circuit devices such as, e.g., programmable logic devices (PLDs).

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® family, include DSP blocks, each of which may include four 18-by-18 multipliers. Each of those DSP blocks also may include adders and registers, as well as programmable connectors (e.g., multiplexers) that allow the various components to be configured in different ways. In each such block, the multipliers can be configured not only as four individual 18-by-18 multipliers, but also as four smaller multipliers, or as one larger (36-by-36) multiplier. In addition, one 18-by-18 complex multiplication (which decomposes into two 18-by-18 multiplication operations for each of the real and imaginary parts) can be performed.

Larger multiplications can be performed by using more of the 18-by-18 multipliers—e.g., from other DSP blocks. For example, a 54-by-54 multiplier can be decomposed, by linear decomposition, into a 36-by-36 multiplier (which uses the four 18-by-18 multipliers of one DSP block), two 36-by-18 multipliers (each of which uses two 18-by-18 multipliers, for a total of four additional 18-by-18 multipliers, consuming another DSP block), and one 18-by-18 multiplier, consuming a portion of a third DSP block. Thus, using 18-by-18 multipliers, nine multipliers are required to perform a 54-by-54 multiplication. Similarly, as noted above, using 18-by-18 multipliers, four multipliers are required to perform a 36-by-36 multiplication

SUMMARY OF THE INVENTION

The present invention reduces the number of multipliers of a particular size that are required to perform a multiplication larger than that size. In the example of a 54-by-54 multiplication, the number of 18-by-18 multipliers required may be reduced from nine to six by using a ternary decomposition. As discussed in more detail below, each 54-bit number is split into three 18-bit numbers. Before multiplication, the 18-bit numbers are added in six different combinations. These combinations are multiplied to produce three terms, and six of the 18-bit numbers are multiplied to produce three terms, for a total of six unique terms. These 6 unique terms are added, with twelve different offsets, to generate the 108-bit product. Although the additional adders required add to the required device area for this computation, the decomposition reduces the number of multipliers required, which are even more area-intensive. And bit is well-suited for a programmable integrated circuit device, where the entire operation can occur in a relatively small number of clock cycles.

In such an implementation, while only six multipliers are required, additional adders may be required. In addition, in at least one embodiment, at least one of the multipliers may be required to handle an additional bit in each input; thus, in the 18-by-18 example given above, at least one of the multiplications may be a 19-by-19 multiplication. 19-by-19 multipliers may be provided, or an "extension" of each multiplication may be provided, by appropriately configuring available programmable logic.

Similarly, in the example of a 36-by-36 multiplication, the number of 18-by-18 multipliers required may be reduced from four to three. This may be achieved by using a binary decomposition rather than a ternary decomposition.

According to a further aspect of the present invention, a specialized processing block including six 18-by-18 multipliers and circuitry for adding the outputs of those multipliers may be used to perform, using a ternary decomposition, a 54-by-54 multiplication, or may be partitioned into two half-blocks having three multipliers, to perform, using binary decomposition, two 36-by-36 multiplications.

Therefore, in accordance with the present invention, there is provided a specialized processing block for performing multiplication operations in a programmable integrated circuit device. The specialized processing block includes a first number of multiplier circuits of a first size, a second number of pre-adders, and a third number of block inputs. Respective pairs of the block inputs are connected to respective ones of a first subset of the multiplier circuits. The respective pairs of the block inputs are also combined in the pre-adders and then input to a second subset of the multiplier circuits. There also is a fourth number of additional inputs. A first set of controllable elements controllably select between the additional inputs, and outputs of some of the pre-adders, for input to one of the multipliers, and also controllably select between the additional inputs, and some of the block inputs, for input to some of the pre-adders. A plurality of shifters shift partial product outputs of each of the multipliers by one or more shift amounts to provide one or more shifted partial product outputs from each of the multipliers. A joint adder structure combines the shifted partial product outputs of the multipliers. A second set of controllable elements controllably connects and disconnects certain ones of the shifted partial products to or from the joint adder structure. A third controllable element selectively splits the joint adder structure into two smaller adder structures.

A method for configuring such a programmable device, and a machine-readable data storage medium encoded with software for performing the method, are also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1A:
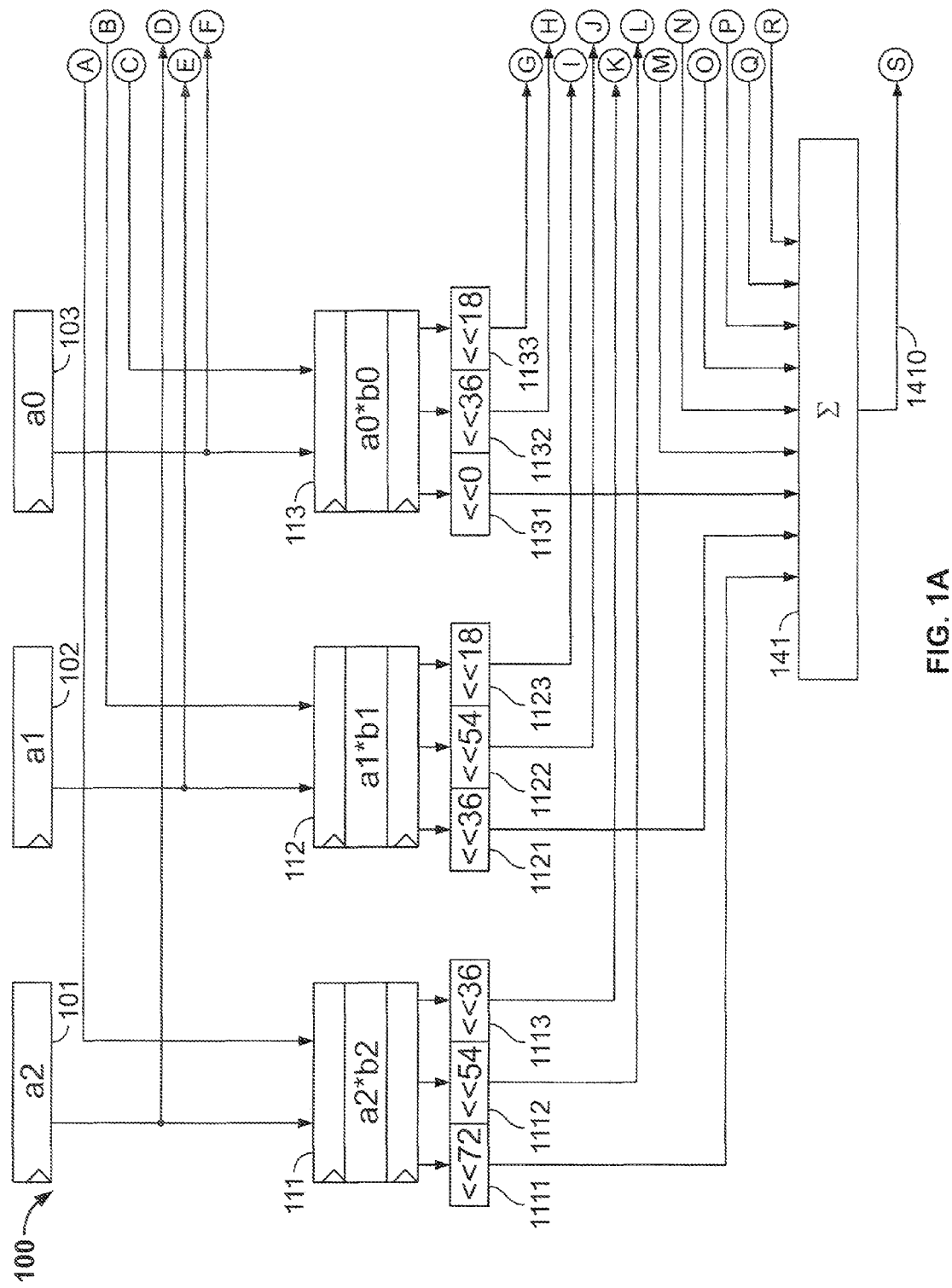
FIGS. 1A and 1B (hereinafter collectively referred to as FIG. 1) are a diagram of the logic flow, and a circuit configuration with which a programmable device may be programmed, for performing multiplication in accordance with an embodiment of the disclosure.

When a 54-by-54 multiplication (e.g., for double-precision floating-point operations) is implemented in 18-by-18 multipliers using a ternary linear decomposition, each of the two 54-bit operands a and b can be expressed as a set of 18-bit numbers $a_2:a_1:a_0$ and $b_2:b_1:b_0$, so that their product can be represented as follows:

$$(2^{2x}+a_2+2^x a_1+a_0)*(2^{2x}+b_2+2^x b_1+b_0)$$

The power-of-2 factors represent left-shifting by a number of places equal to the exponent. Expanding, the 54-by-54 multiplication is:

$$2^{4x}a_2b_2+2^{3x}a_2b_1+2^{2x}a_2b_0+2^{3x}a_1b_2+2^{2x}a_1b_1+2^x a_1b_0+2^{2x}a_0b_2+2^x a_0b_1+a_0b_0$$

There are nine unique terms $a_n b_m$, so nine multipliers are required.

Instead, however, the 18-bit components $a_n$, $b_m$ can be combined as follows:

$$A:(a_2+a_1)*(b_2+b_1)=a_2b_2+a_2b_1+a_1b_2+a_1b_1$$

$$B:(a_1+a_0)*(b_1+b_0)=a_1b_1+a_1b_0+a_0b_1+a_0b_0$$

$$C:(a_2+a_0)*(b_2+b_0)=a_2b_2+a_2b_0+a_0b_2+a_0b_0$$

Grouping terms from the linear decomposition:

$$2^{4x}a_2b_2+2^{3x}(a_2b_1+a_1b_2)+2^{2x}(a_2b_0+a_0b_2)+2^x(a_1b_0+a_1b_1)+a_0b_0$$

Substituting A, B, and C into these expressions:

$$2^{4x}a_2b_2+2^{3x}(A-a_2b_1+a_1b_1)+2^{2x}(C-a_2b_2-a_0b_0+a_1b_1)+2^x(B-a_2b_2-a_0b_0)+a_0b_0$$

In this formulation of the computation, there are only six unique terms A, B, C and $a_n b_m$ (n=0, 1, 2), but a total of twelve terms. By comparison, the linear decomposition includes nine unique terms $a_n b_m$ (n=0, 1, 2; m=0, 1, 2), constituting nine total terms. Therefore, it is possible to trade off multipliers (specific and expensive) for adders (general purpose and inexpensive).

Each term A, B, C is a product of two terms $(a_n+a_m)$ and $(b_p+b_q)$, each of which is the sum of two 18-bit numbers and is therefore 19-bits wide. Thus, computing A, B or C requires a 19-by-19 multiplier. These multipliers may be provided on the device, or a 19-by-19 multiplication may be performed by "extending" an 18-by-18 multiplier using three AND gates and an adder, as described below. 18-by-19 multipliers are provided in the STRATIX® V FPGA available from Altera Corporation, and such multipliers also may be extended for 19-by-19 operations.

As noted above, according to a further aspect of the present invention, a specialized processing block including six 18-by-18 multipliers (extendable as discussed above, and further discussed below), and circuitry for adding the outputs of those multipliers, may be particularly well-suited for implementing this computation which, as mentioned above, includes six unique terms. Pre-adders for preprocessing of the inputs also may be included in the specialized processing block.

In addition, it sometimes is necessary or desired to perform a 36-by-36 multiplication (e.g., for single-precision floating-point operations), which normally requires four 18-by-18 multipliers. However, such a multiplication also may be implemented using a binary decomposition, in which each of the two 36-bit operands a and b can be expressed as a set of 18-bit numbers $a_1:a_0$ and $b_1:b_0$. It can readily be established that such a decomposed operation can be implemented using three 18-by-18 multipliers rather than the four 18-by-18 multipliers otherwise required. This type of decomposition, and recursive extensions thereof, is referred to as a "Karatsuba decomposition." Higher-order versions of this decomposition, such as the ternary decomposition described above, are sometimes referred to as "Karatsuba-like." However, for ease of description, both binary and higher-order decompositions of this type will be described as "Karatsuba decompositions."

Because a ternary Karatsuba decomposition uses six multipliers while a binary Karatsuba decomposition uses three multipliers, in accordance with a still further aspect of the present invention the aforementioned six-multiplier specialized processing block (which is capable of performing a ternary Karatsuba decomposition) may be partitioned into two sub-blocks, each containing three 18-by-18 multipliers (and each therefore able to perform a respective 36-by-36 multiplication using a binary Karatsuba decomposition).

As discussed further below, the partitioning of the larger six-multiplier specialized processing block may be achieved by providing programmable elements, such as multiplexers and AND gates (although other programmable elements also may be used), to make or break certain connections as described below.

The invention will now be described with reference to FIGS. 1-9.

Figure 1B:
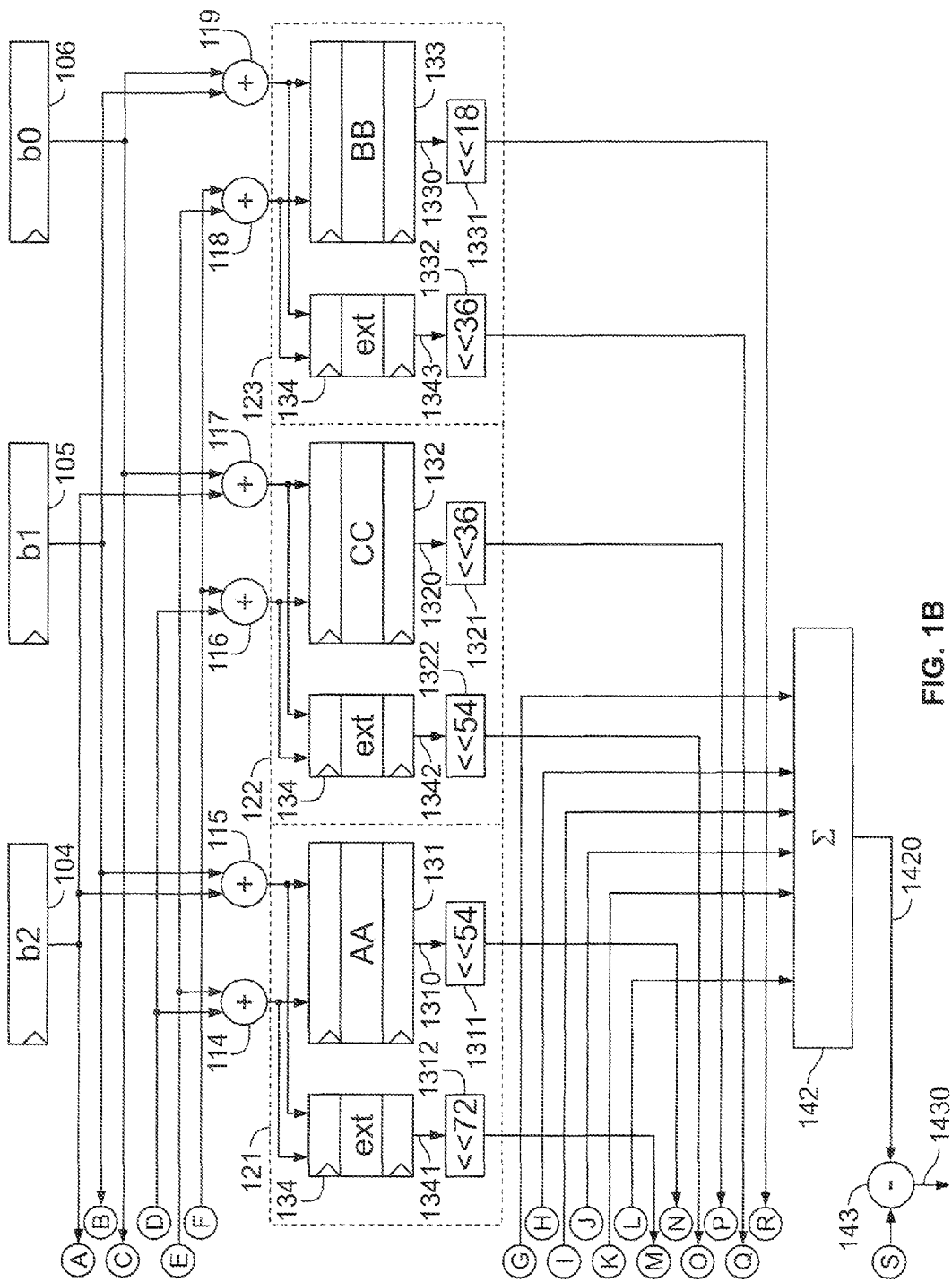

FIG. 1 is a diagram 100 of examples of both the logic flow, and an embodiment of a circuit configuration, with which a programmable device, such a CYCLONE® FPGA from Altera Corporation (having 18-by-18 multipliers), may be programmed, for multiplying a first 54-bit number a by second 54-bit number b. Inputs or input registers 101-106 represent the six 18-bit components $a_2[a53:36]$, $a_1[a35:18]$, $a_0[a17:0]$, $b_2[b53:36]$, $b_1[b35:18]$, $b_0[b17:0]$ of a and b. Each of registers 101-106 feeds one of 18-by-18 multipliers 111, 112, 113 which produce, respectively, the three terms $a_n b_m$ (n=0, 1, 2) discussed above.

The output of multiplier 111 is shifted by 72-bit left-shifter 1111 representing the $2^{4x}$ factor above, by 54-bit left-shifter 1112 representing the $2^{3x}$ factor above, and by 36-bit left-shifter 1113 representing the $2^{2x}$ factor above. The output of multiplier 112 is shifted by 54-bit left-shifter 1122 representing the $2^{3x}$ factor above, by 36-bit left-shifter 1121 representing the $2^{2x}$ factor above, and by 18-bit left-shifter 1123 representing the $2^{x}$ factor above. The output of multiplier 113 is shifted by 36-bit left-shifter 1132 representing the $2^{2x}$ factor above, by 18-bit left-shifter 1133 representing the $2^{x}$ factor above, and by 0-bit left-shifter 1131 (which could be omitted).

Each of registers 101-106 also feeds appropriate ones of adders 114, 115, 116, 117, 118, 119, each of which provides one of terms $(a_n+a_m)$ or $(b_p+b_q)$ as described above for input to 19-by-19 multipliers 121, 122, 123 that compute A, B and C. Each 19-by-19 multiplier 121, 122, 123 includes a respective 18-by-18 multiplier 131, 132, 133, that operates on the lower 18 bits of the adder outputs (designated in the drawing as AA, BB and CC because they compute only a portion of A, B or C), plus an extension block 134.

The output 1310 of multiplier 131 of multiplier 121 is shifted by 54-bit left-shifter 1311 representing the $2^{3x}$ factor above. The extension process requires an additional 18-bit shift, so the output 1341 of extension block 134 of multiplier 121 is shifted by 72-bit left-shifter 1312 representing the $2^{3x}$ factor and the additional 18 bits. The output 1320 of multiplier 132 of multiplier 122 is shifted by 36-bit left-shifter 1321 representing the $2^{2x}$ factor above. The output 1342 of extension block 134 of multiplier 122 is shifted by 54-bit left-shifter 1322 representing the $2^{2x}$ factor and the additional 18 bits. The output 1330 of multiplier 133 of multiplier 123 is shifted by 18-bit left-shifter 1331 representing the $2^{x}$ factor above. The output 1343 of extension block 134 of multiplier 123 is shifted by 72-bit left-shifter 1332 representing the $2^{x}$ factor and the additional 18 bits.

The various shifter outputs are summed as shown by summers 141, 142, and sum 1420 is subtracted from sum 1410 at 143, as shown to provide the final 108-bit result 1430.

The aforementioned extension process works as follows:

If the two 19-bit inputs are referred to as "x" and "y," then if the 19th or most-significant bit (MSB) of x (x[18]) is "1", then the 18 least-significant bits of y (y[17:0]), left shifted by 18 bits, should be added to the product xy[35:0]. If the MSB (19th bit) of y (y[18]) is "1," then the 18 least-significant bits of x (x[17:0]), left shifted by 18 bits, should be added the product xy[35:0]. The logical AND of the two MSBs (x[18] and y[18]), left shifted by 36 bits, also should be added the product xy[35:0]. These additions occur in summers 141, 142.

Figure 2:
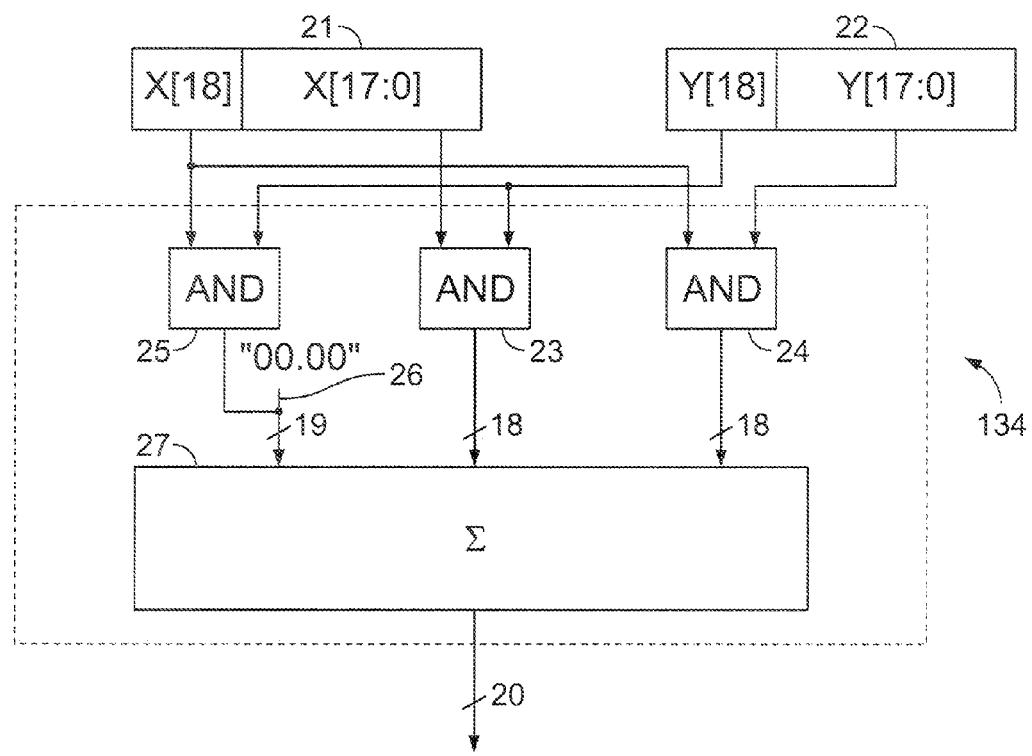
FIG. 2 is a diagram of the logic flow, and a circuit configuration with which a programmable device may be programmed, for a multiplier extension in accordance with an embodiment of the disclosure.

FIG. 2 shows both the logic flow, and an embodiment of a circuit configuration with which a programmable device may be programmed, for extension block 134 that performs the extension process. Inputs 21, 22 hold the 19-bit inputs X and Y, broken down into a most-significant bit X[18] or Y[18] and 18 least-significant bits X[17:0] or Y[17:0].

AND-gate 23 combines the X[18] bit and the Y[17:0] bits to implement the aforementioned addition of Y[17:0] when X[18] is "1". AND-gate 24 combines the Y[18] bit and the X[17:0] bits to implement the aforementioned addition of X[17:0] when Y[18] is "1". AND-gate 25 combines the X[18] bit and the Y[18] bit, and that result is concatenated at 26 with 18 0's, to implement the aforementioned logical ANDing of the two MSBs, and 18 bits of the aforementioned 36-bit shifting of that logical AND result. These three results are then summed at 27.

Although multiplication operations in accordance with the invention have been described thus far in terms of a 54-by-54 multiplication being broken down into a number of 18-by-18 multiplications, the present invention can be used to break down any large multiplication by breaking the inputs down into smaller segments. Thus, a 48-by-48 multiplication can be broken down into a number of 16-by-16 multiplications by breaking the inputs into three 16-bit segments. The number of multipliers needed will be equal to the number of terms—e.g., two numbers each broken into three segments will require six multipliers (plus three extension blocks)—instead of the square of the number of terms. And if the segments are smaller than 18-by-18, where 18-by-18 multipliers are available, then no extension blocks would be required.

Figure 3:
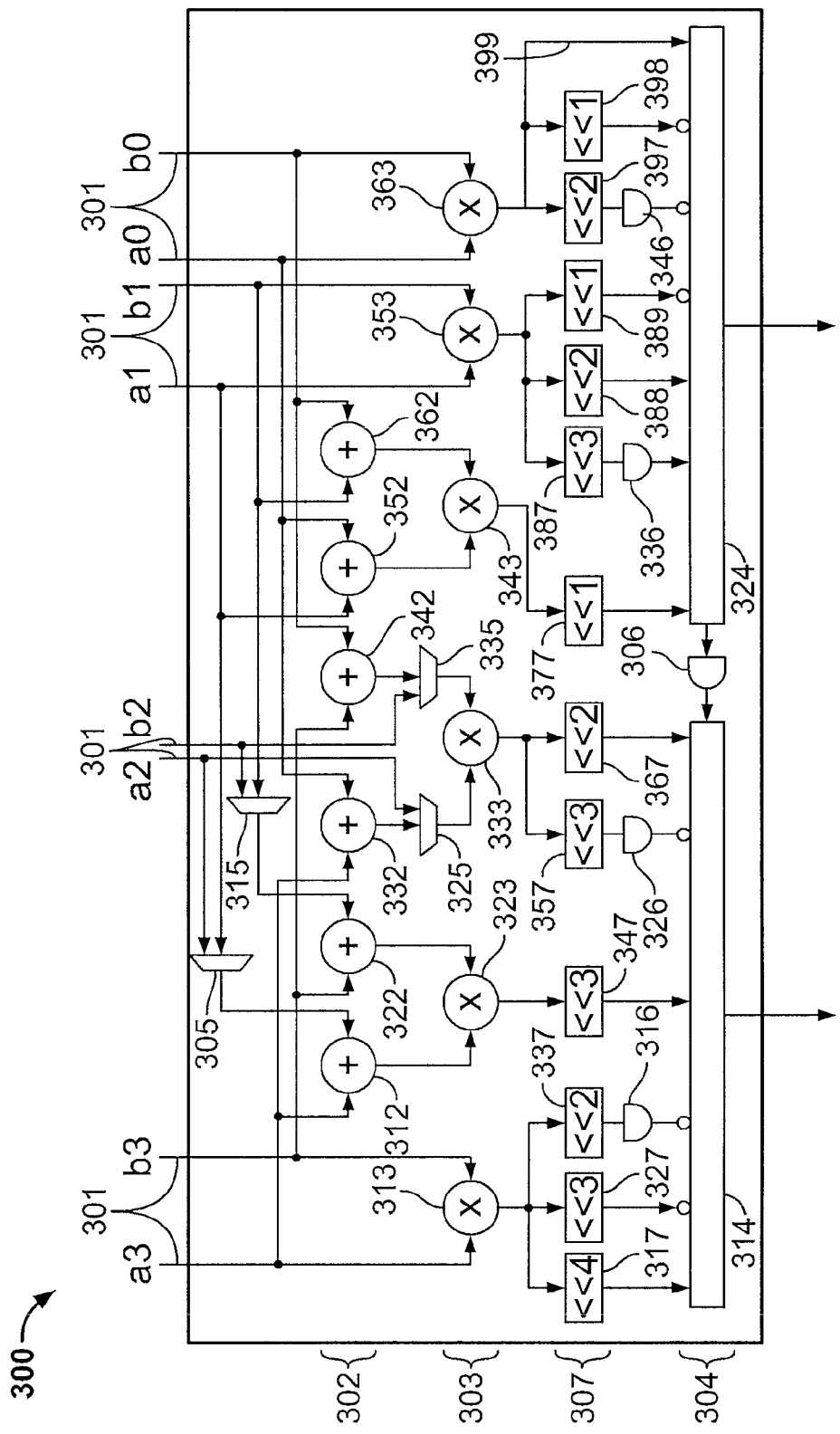
FIG. 3 is a schematic diagram of a specialized processing block that may be incorporated in a programmable device, and which is particularly well-suited to implement an embodiment of the invention.

FIG. 3 shows an embodiment of a six-multiplier specialized processing block 300, as discussed above, that may be used to implement another embodiment of a logical configuration to carry out a 54-by-54 multiplication (e.g., for double-precision operations), and that may be partitioned into two three-multiplier sub-blocks that may carry out respective 36-by-36 multiplications (e.g., for single-precision operations). And as discussed in the preceding paragraph, multiplications of other sizes may be implemented if the individual multipliers of specialized processing block 300 are of a size other than 18-by-18.

In specialized processing block 300, the foregoing first, second and third numbers are six and the fourth number is two, so that specialized processing block 300 has eight inputs 301, six pre-adders 312, 322, 332, 342, 352 and 362 (collectively referred to as 302), and six multipliers 313, 323, 333, 343, 353 and 363 (collectively referred to as 303) which may, as noted above, be 18-by-18 multipliers and may further be extendable as discussed. Various shifters 317, 327, 337, 347, 357, 367, 377, 387, 388, 389, 397 and 398 (collectively referred to as 307) are applied to the outputs of multipliers 303. The indicated shifts are denoted in numbers of words (e.g., numbers of groups of 18 bits in a case where the multipliers 303 are 18-by-18 multipliers), and align the multiplier outputs as discussed below in connection with FIGS. 6 and 7. The aligned multiplier outputs are combined by a joint adder structure, including structures such as compressors that perform addition operations without carries, and structures such as carry-propagate adders that perform addition operations with carries. The joint adder structure is indicated collectively at 304.

Multiplexers 305/315/325/335 and AND gates 306/316/326/336/346 may be provided to programmably select between the full specialized processing block 300 for use, e.g., in a 54-by-54 multiplication as described, and the partitioned specialized processing block 300, divided into the aforementioned sub-blocks, for use, e.g., in two 36-by-36 multiplications as described. Multiplexers 305/315/325/335 control the routing of inputs 301 to pre-adders 302, while one AND gate 306 partitions the joint compressor/carry-propagate adder structure 304 into two smaller compressor/carry-propagate adder structures 314/324, and the remaining AND gates 316/326/336/346 determine whether or not certain shifted multiplier outputs are routed to the compressor/carry-propagate adder structures 304/314/324.

Figure 4:
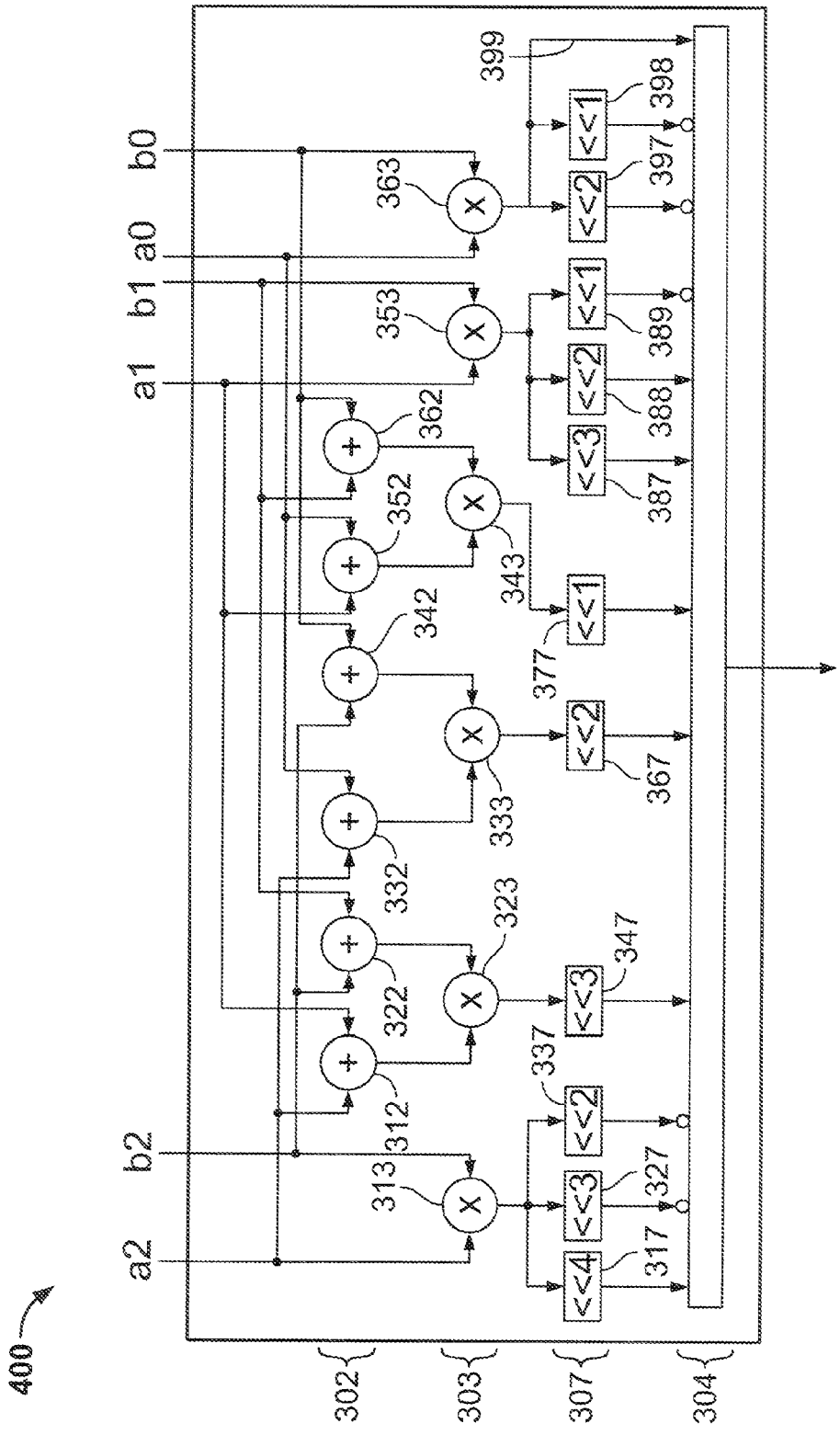
FIG. 4 is a schematic diagram of the specialized processing block of FIG. 3 configured according to an embodiment of the invention to implement a single multiplication operation of a first size.

FIG. 4 shows one implementation 400 in which specialized processing block 300 may be configured by multiplexers 305/315/325/335 and AND gates 306/316/326/336/346 as a single block for a 54-by-54 multiplication $\{a_3:a_1:a_0\}*\{b_3:b_1:b_0\}$. Multiplexer 305 selects input $a_1$ rather than input $a_2$ for pre-adder 312, and multiplexer 315 selects input $b_1$ rather than input $b_2$ for pre-adder 312. Multiplexers 325 and 335 select the outputs of pre-adders 332 and 342, rather than inputs $a_2$ and $b_2$, as the inputs of multiplier 333. Similarly, AND gate 306 is turned ON to maintain compressor/carry-propagate adder structures 314/324 as a single larger compressor/carry-propagate adder structure 304, and AND gates 316, 336 and 346 are turned ON to connect the outputs of shifters 337, 387 and 397 to compressor/carry-propagate adder structure 304 while AND gate 326 is turned OFF to disconnect the output of shifter 357 from compressor/carry-propagate adder structure 304.

Figure 5:
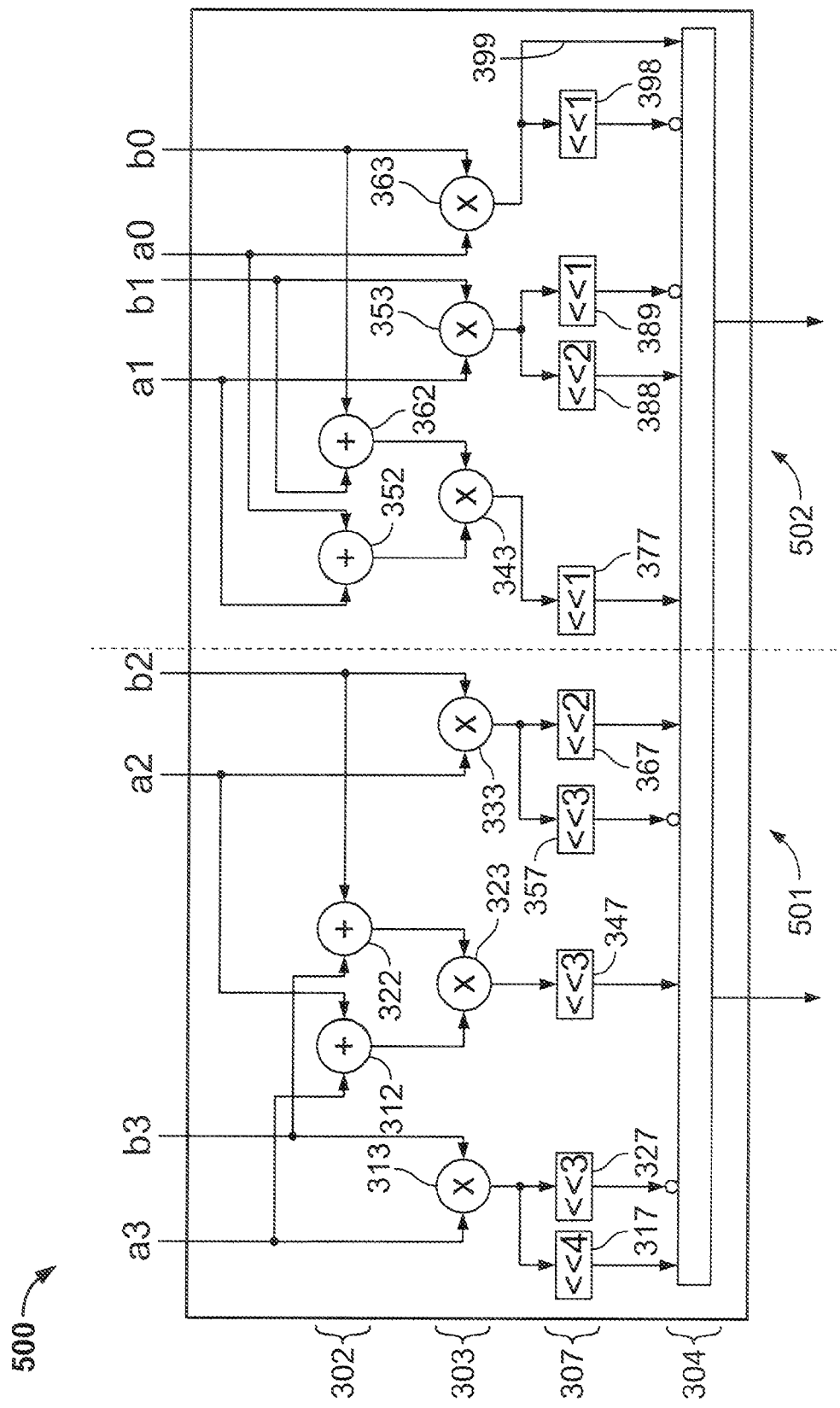
FIG. 5 is a schematic diagram of the specialized processing block of FIG. 3 configured according to an embodiment of the invention to implement two multiplication operations of a second size smaller than the first size.

FIG. 5 shows one implementation 500 in which specialized processing block 300 may be configured by multiplexers 305/315/325/335 and AND gates 306/316/326/336/346 as two sub-blocks 501/502 for performing two 36-by-36 multiplications $\{a_3:a_2\}*\{b_3:b_2\}$ and $\{a_1:a_0\}*\{b_1:b_0\}$. Multiplexer 305 selects input $a_2$ rather than input $a_1$ for pre-adder 312, and multiplexer 315 selects input $b_2$ rather than input $b_1$ for pre-adder 312. Multiplexers 325 and 335 select inputs $a_2$ and $b_2$, rather than the outputs of pre-adders 322 and 332, as the inputs of multiplier 333. Similarly, AND gate 306 is turned OFF to maintain compressor/carry-propagate adder structures 314/324 as separate structures, and AND gates 316, 336 and 346 are turned OFF to connect the outputs of shifters 337, 387 and 397 from compressor/carry-propagate adder structures 314/324, while AND gate 326 is turned ON to connect the output of shifter 357 to compressor/carry-propagate adder structure 324.

The differences between the input, pre-adder and multiplier pattern of implementation 400 of FIG. 4, and the input, pre-adder and multiplier pattern of implementation 500 of FIG. 5, are that in implementation 500:

a. There are two additional 18-bit inputs ($a_2$ and $b_2$). These inputs ($a_2$ and $b_2$) feed multiplier 333, bypassing pre-adders 332/342;

b. Inputs $a_2$ and $b_2$ also feed the right inputs of pre-adders 312/322.

These input, pre-adder and multiplier pattern differences account for multiplexers 305/315/325/335.

The differences between the shift pattern into the compressor/carry-propagate adder structure of implementation 400 of FIG. 4, and the shift pattern into the compressor/carry-propagate adder structure of implementation 500 of FIG. 5, are that in implementation 500:

a. 2-word shifter 337 is not used;

b. Additional 3-word shifter 357 is used (multiplier 333 is 19-by-19, so this requires a 38-bit AND-gate 326).

c. 3-word shifter 387 is not used (this saves a 38-bit AND-gate 336); alternatively, shifter 387 could be multiplexed between outputs of multiplier 333 (for 36-by-36 mode) and multiplier 353 (for 54-by-54 mode);

d. 2-word shifter 397 is not used (this saves a 36-bit AND gate 346).

Remembering that specialized processing block 300 is a single block regardless of whether implementation 400 or implementation 500 is in use, and considering the rightmost end as drawn to be the least significant bit, the reason for the different shifting patterns of the two implementations becomes clear. There are thirteen possible inputs to compressor/carry-propagate adder structure 304, including the twelve inputs that pass through one of the twelve shifters 317, 327, 337, 347, 357, 367, 377, 387, 388, 389, 397 and 398, as well as one input on lead 399 which may be considered a zero shift.

If one considers the two sub-blocks 501, 502 of FIG. 5, they should be functionally identical, because each is performing a binary decomposition. But because the inputs are all aligned to the least significant bit of the overall block 500, which is in sub-block 502. Therefore all of the shifts in sub-block 501 have to result in the same relative shifts of the values in sub-block 501 as are performed on the values in sub-block 502, but also are offset beyond all of the bits of the values in sub-block 502.

Figure 6:
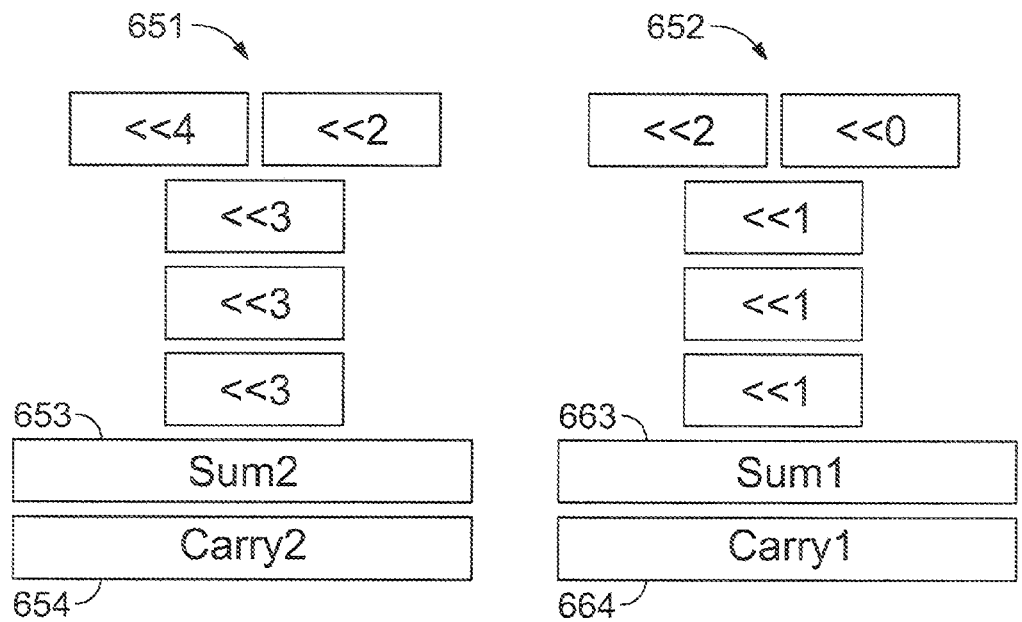
FIG. 6 shows an alignment pattern for partial products in the implementation of FIG. 5.

This is shown in FIG. 6, which shows an alignment pattern 651 that is implemented in compressor/carry-propagate adder structure 314 of block 501, and an alignment pattern 652 that is implemented in compressor/carry-propagate adder structure 324 of block 502, for the separate 36-by-36 multiplications. As can be seen, the shifting pattern of the aligned values in pattern 651 is the same as the shifting pattern of the aligned values in pattern 652, except that pattern 651 is offset by two word lengths from pattern 652. Each pattern 651/652 includes five values shifted by various amounts, for a total of ten shifted values, corresponding to the thirteen possible values, less three values disconnected by turning OFF AND-gates 316/336/346. Each results in a compressed output including respective sum vectors 653/663 and respective carry vectors 654/664, which are separately combined (not shown) in respective separate carry-propagate adders.

Figure 7:
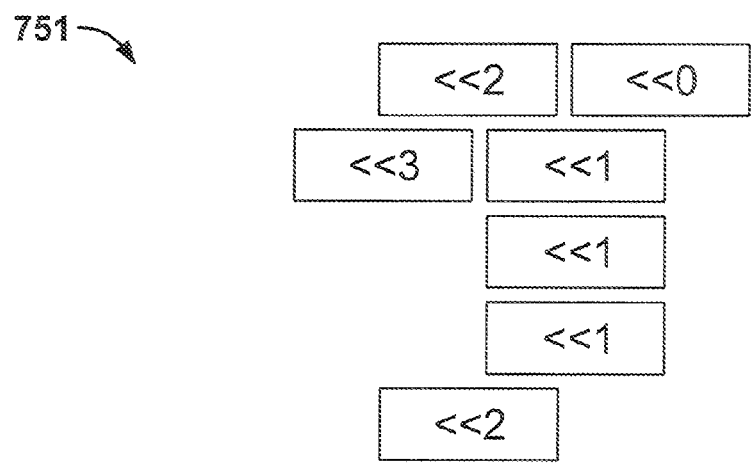
FIG. 7 shows an alignment pattern for partial products in the implementation of FIG. 4.
Figure 7:
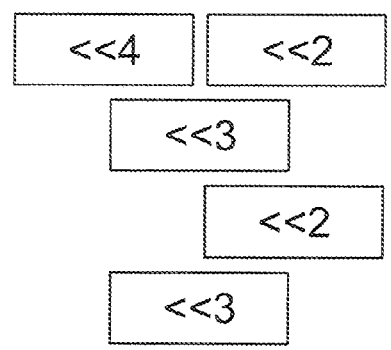

In comparison, FIG. 7 shows the alignment pattern 751 used for the 54-by-54 multiplication. As seen, twelve of the thirteen possible shifted values are used, reflecting the turning OFF of AND-gate 326.

Figure 8:
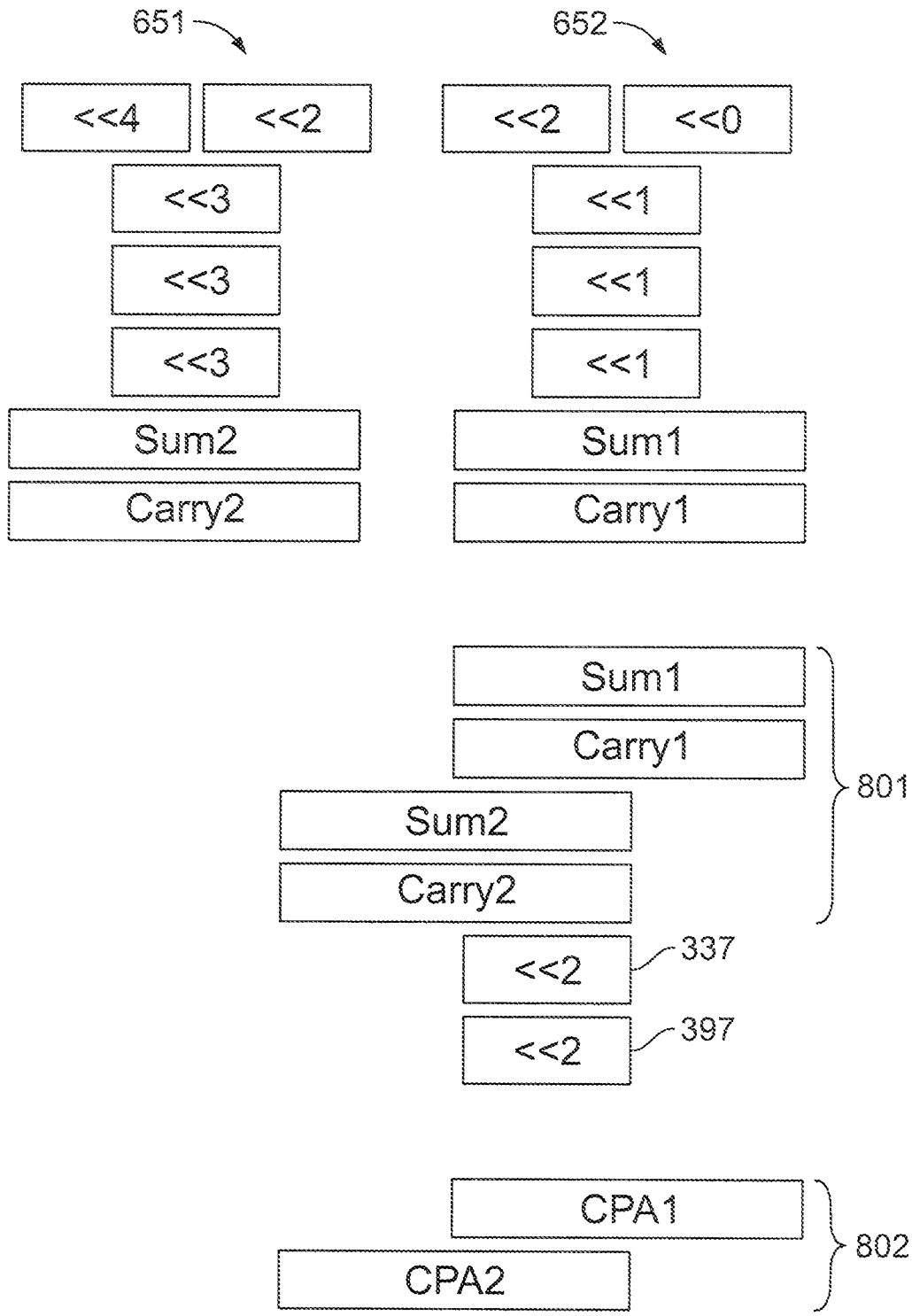
FIG. 8 shows further detail of the alignment pattern of FIG. 7.

As seen in FIG. 8, the same structures 651/652 that produce the two separate results for the parallel 36-by-36 multiplications can be used for the 54-by-54 multiplication. Because in the 54-by-54 case, AND-gate 336 is turned ON while AND-gate 326 is turned OFF, shifted value 387 is used while shifted value 357 is not, which is the opposite of the situation in the 36-by-36 case. Both shifted values 357/387 are shifted by three words, so value 387 can replace value 357 in pattern 651. Indeed, because only one of values 357/387 is used at any one time, instead of two AND-gates 326/336 to turn values 357/387 ON and OFF, a single multiplexer can be provided (not shown) to select between the two values.

The two resulting sum and carry vector pairs 653/654 and 663/664, can be overlapped as shown at 801, and further combined with shifted values 337 and 397 (provided by turning ON AND-gates 316 and 346 which are turned OFF for the 36-by-36 case) using two overlapping carry-propagate adders as shown at 802, providing the result shown in FIG. 7. Thus, all shifted values for the 54-by-54 case are accounted for.

Figure 9:
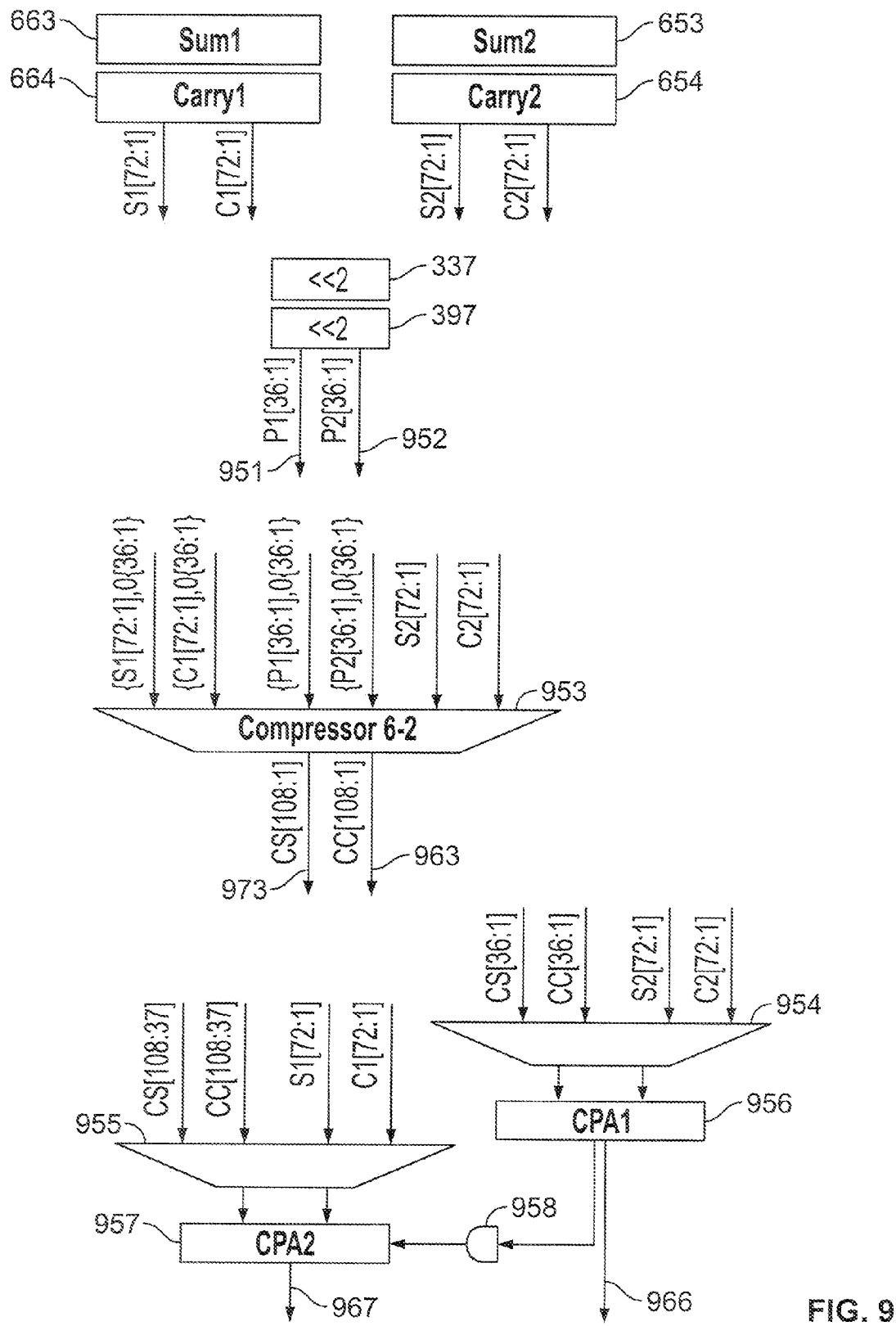
FIG. 9 shows an arrangement of compressors and carry-propagate adders that may be used in an implementation such as that of FIG. 4.

FIG. 9 shows how the sum and carry vector pairs 653/654 and 663/664 are combined in the two cases (36-by-36 and 54-by-54). As seen each sum vector S1 and S2 (663/653) and each carry vector C1 and C2 (664/654) is 72 bits wide. As also seen, the combination (e.g., using a small carry-propagate adder (not shown)) of partial product values 337 and 397 results in two product vectors P1 and P2 (951/952). Those six vectors, P1, P2, C1, C2, S1 and S2, are input to a 6:2 compressor 953 which provides a compressed carry vector CC (963) and a compressed save vector CS (973). Alternatively, uncompressed carry and save vectors from values 337 and 397 can be input along with P1, P2, C1, C2, S1 and S2 to an 8:2 compressor (not shown).

Outputs 966/967 of carry-propagate adders 956/957 can be the separate 36-by-36 outputs in the 36-by-36 case, where sum vector S2 (653) and carry vector C2 (654) are input to carry-propagate adder 956 and sum vector S1 (663) and carry vector C1 (664) are input to carry-propagate adder 957. Alternatively, in the 54-by-54 case, the carry from the 36th bit of carry-propagate adder 956 is routed via AND-gate 958 to the carry input of carry-propagate adder 957. In the 54-by-54 case, C2 and S2, along with the lower 36 bits of each of CC and CS are input via 4:2 multiplexer 954 to carry-propagate adder 956, while C1 and S1, along with the upper 72 bits of each of CC and CS are input via 4:2 multiplexer 955 to carry-propagate adder 957. Other splits between carry-propagate adders 956 and 957 can be used, as long as a value is carried out from the most significant compressor input position of carry-propagate adder 956 and carried in to carry-propagate adder 957.

It should be noted that each of the shifter elements described above could be implemented as logic, or could include essentially only wires, with little or no additional logic required.

Thus it is seen that a block such as block 301 including a number of multipliers can be used to efficiently carry out either a ternary decomposition of a larger multiplication or two binary decompositions of two smaller multiplications (using half the number multipliers for each), using essentially the same partial product alignment pattern.

A method according to the invention configures a programmable integrated circuit device, such as a PLD, having such a block, to create the structures shown in FIGS. 4-9 to perform multiplications larger than the multipliers provided on the device, using a smaller number of multipliers than previous methods, by virtue of being able to perform the aforementioned decompositions.

Instructions for carrying out the method according to this invention may be encoded on a machine-readable medium, to be executed by a suitable computer or similar device to implement the method of the invention for programming or configuring programmable integrated circuit devices to perform operations as described above. For example, a personal computer may be equipped with an interface to which a programmable integrated circuit device can be connected, and the personal computer can be used by a user to program the programmable integrated circuit device using a suitable software tool, such as the QUARTUS® II software available from Altera Corporation, of San Jose, Calif.

Figure 10:
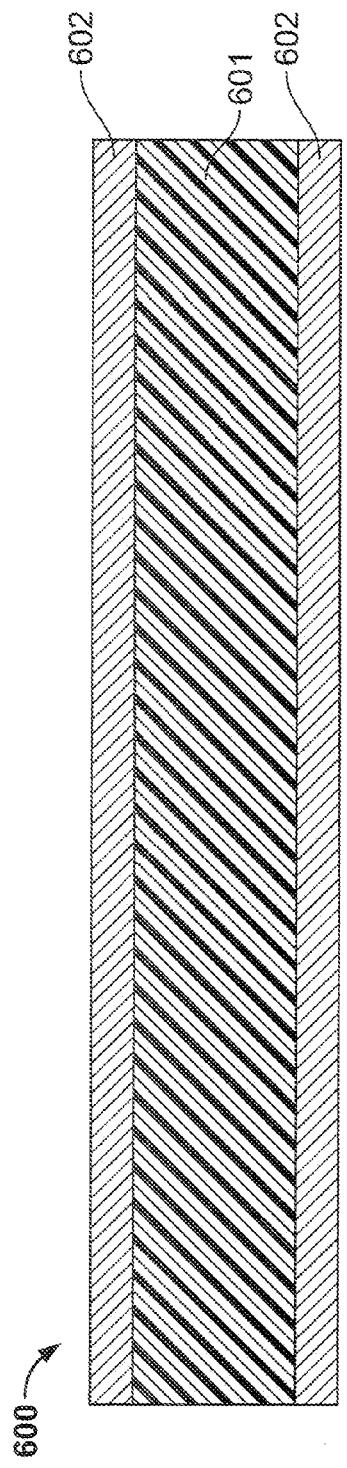
FIG. 10 is a cross-sectional view of a magnetic data storage medium encoded with a set of machine-executable instructions for performing the method according to the present invention.

FIG. 10 presents a cross section of a magnetic data storage medium 600 which can be encoded with a machine executable program that can be carried out by systems such as the aforementioned personal computer, or other computer or similar device. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 11:
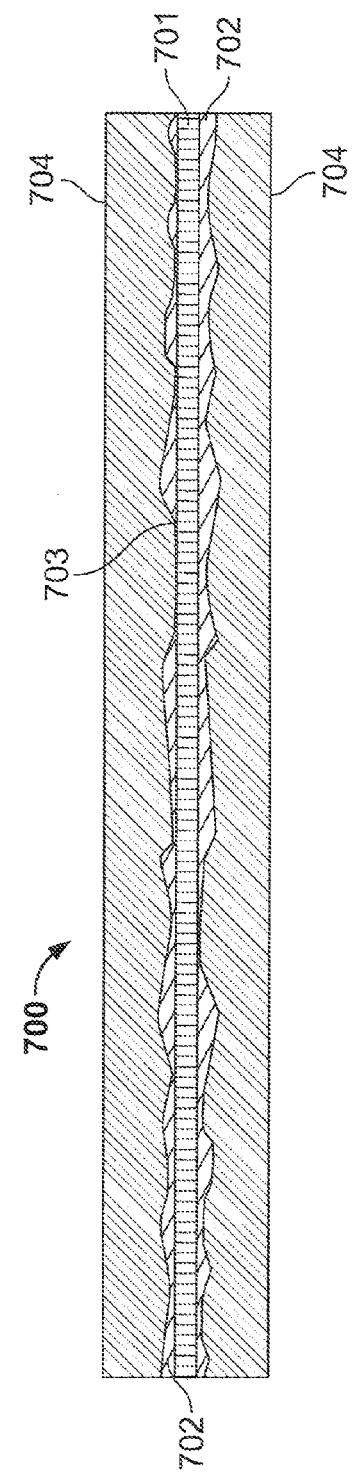
FIG. 11 is a cross-sectional view of an optically readable data storage medium encoded with a set of machine executable instructions for performing the method according to the present invention.

FIG. 11 shows a cross section of an optically-readable data storage medium 700 which also can be encoded with such a machine-executable program, which can be carried out by systems such as the aforementioned personal computer, or other computer or similar device. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

Thus it is seen that a method for efficiently carrying out large multiplications in a programmable integrated circuit device, a programmable integrated circuit device programmed to perform the method, and software for carrying out the programming, have been provided.

Figure 12:
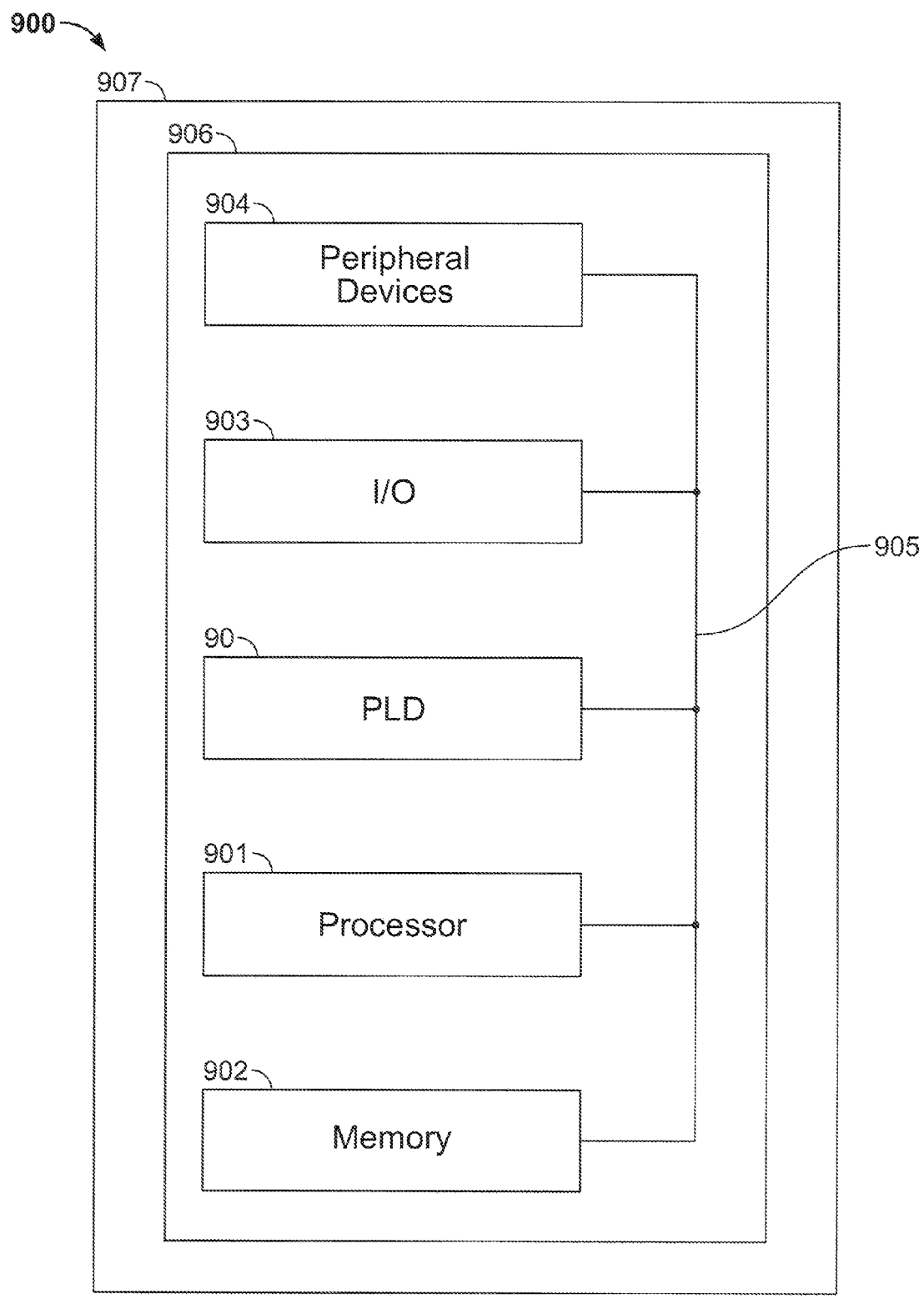
FIG. 12 is a simplified block diagram of an illustrative system employing a programmable logic device incorporating the present invention.

A PLD 90 programmed according to the present invention may be used in many kinds of electronic devices. One possible use is in a data processing system 900 shown in FIG. 12. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions.

For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention.

For example, the various elements of this invention can be provided on a programmable integrated circuit device in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A specialized processing block for performing multiplication operations in a programmable integrated circuit device, said specialized processing block comprising:
    a first number of multiplier circuits of a first size;
    a second number of pre-adders;
    a third number of block inputs, respective pairs of said block inputs being connected to respective ones of a first subset of said multiplier circuits, said respective pairs of said block inputs also being combined in said pre-adders and then input to a second subset of said multiplier circuits;
    a fourth number of additional inputs;
    a first set of controllable elements that controllably select between said additional inputs, and outputs of some of said pre-adders, for input to one of said multipliers, and that controllably select between said additional inputs, and some of said block inputs, for input to some of said pre-adders;
    a plurality of shifters so that partial product outputs of each of said multipliers are shifted by one or more shift amounts to provide one or more shifted partial product outputs from each of said multipliers;
    a joint adder structure for combining said shifted partial product outputs of said multipliers;
    a second set of controllable elements that controllably connect and disconnect certain ones of said shifted partial products to or from said joint adder structure; and
    a third controllable element for selectively splitting said joint adder structure into two smaller adder structures; wherein:
    when said third controllable element is controlled to maintain said joint adder structure as one adder structure, said second set of controllable elements connects and disconnects said certain ones of said shifted partial products to support one ternary Karatsuba decomposition of one multiplication operation; and
    when said third controllable element is controlled to split said joint adder structure into said two smaller adder structures, said second set of controllable elements connects and disconnects said certain ones of said shifted partial products to support two separate binary Karatsuba decompositions of two multiplication operations using respective third and fourth subsets of said multipliers.

2. The specialized processing block of claim 1 wherein said joint adder structure comprises compressors that perform addition operations without carries and adders that perform addition operations with carries.

3. The specialized processing block of claim 1 wherein:
    said first number is six;
    each of said third and fourth subsets of said multipliers includes three of said multipliers;
    said ternary Karatsuba decomposition performs a multiplication operation that requires nine of said multipliers in the absence of ternary Karatsuba decomposition; and
    each respective one of said first and second binary Karatsuba decompositions performs a respective multiplication operation that requires four of said multipliers in the absence of binary Karatsuba decomposition.

4. The specialized processing block of claim 3 wherein when said third controllable element is controlled to split said joint adder structure into said two smaller adder structures:
    said first set of controllable elements connects said third subset of said multipliers to one of said two smaller adder structures and connects said fourth subset of said multipliers to another of said two smaller adder structures;
    said third subset of said multipliers includes a first group of multipliers from said first and second subsets of said multipliers, and said fourth subset of said multipliers includes a second group of multipliers from said first and second subsets of said multipliers;
    said second set of controllable elements connects and disconnects said certain ones of said shifted partial products to support two separate binary Karatsuba decompositions of two multiplication operations;
    said third subset of said multipliers and said one of said two smaller adder structures performs a first one of said binary Karatsuba decompositions for a first multiplication operation; and
    said fourth subset of said multipliers and said another of said two smaller adder structures performs a second one of said binary Karatsuba decompositions for a second multiplication operation.

5. The specialized processing block of claim 1 wherein, when said third controllable element is controlled to split said joint adder structure into said two smaller adder structures, said first set of controllable elements selects said additional inputs for input to said one of said multipliers and for input to said some of said pre-adders.

6. The specialized processing block of claim 1 wherein said joint adder structure provides two identical but offset patterns for aligning and combining said shifted partial product outputs of said multipliers.

7. The specialized processing block of claim 6 wherein:
    when said third controllable element is controlled to maintain said joint adder structure as one adder structure:
    said first set of controllable elements controllably select said outputs of said some of said pre-adders for input to said one of said multipliers, and controllably select said some of said block inputs for input to said some of said pre-adders;
    said joint adder structure comprises a compressor that compresses combined shifted partial product outputs of said multipliers to provide compressed vectors;
    said joint adder structure further comprises first and second carry-propagate adders;
    a first less significant group of bits of each of said compressed vectors is input to one of said first and second carry-propagate adders;

a second more significant group of bits of each of said compressed vectors is input to another of said first and second carry-propagate adders; and said third controllable element connects, as a carry input to said another of said first and second carry-propagate adders, a bit from said one of said first and second carry-propagate adders corresponding to a most significant bit of said first less significant group of bits.

8. The specialized processing block of claim 1 wherein:
at least one of said multipliers is extended by 1 bit in each dimension beyond said first size.

9. A method of configuring a programmable integrated circuit device to performing multiplication operations, said programmable integrated circuit device including a specialized processing block, said specialized processing block comprising:

a first number of multiplier circuits of a first size, a second number of pre-adders, a third number of block inputs, respective pairs of said block inputs being connected to respective ones of a first subset of said multiplier circuits, said respective pairs of said block inputs also being combined in said pre-adders and then input to a second subset of said multiplier circuits, a fourth number of additional inputs, a first set of controllable elements that controllably select between said additional inputs, and outputs of some of said pre-adders, for input to one of said multipliers, and that controllably select between said additional inputs, and some of said block inputs, for input to some of said pre-adders, a plurality of shifters so that partial product outputs of each of said multipliers are shifted by one or more shift amounts to provide one or more shifted partial product outputs from each of said multipliers, a joint adder structure for combining said shifted partial product outputs of said multipliers, a second set of controllable elements that controllably connect and disconnect certain ones of said shifted partial products to or from said joint adder structure, and a third controllable element for selectively splitting said joint adder structure into two smaller adder structures, said method comprising:

configuring said first and second sets of controllable elements and said third controllable element to select between operation of said specialized processing block as a single block with said first number of multipliers to support one ternary Karatsuba decomposition of one multiplication operation, and operation of said specialized processing block as two sub-blocks each having a respective third or fourth subset of said multipliers including half said first number of multipliers, to support two separate binary Karatsuba decompositions of two multiplication operations.

10. The method of claim 9 wherein:
said first number is six;
each of said third and fourth subsets of said multipliers includes three of said multipliers;
said ternary Karatsuba decomposition performs a multiplication operation that requires nine of said multipliers in the absence of ternary Karatsuba decomposition; and
each respective one of said first and second binary Karatsuba decompositions performs a respective multiplication operation that requires four of said multipliers in the absence of binary Karatsuba decomposition.

11. The method of claim 10 further comprising, when said third controllable element is configured to split said joint adder structure into said two smaller adder structures:

configuring said first set of controllable elements to connect said third subset of said multipliers to one of said two smaller adder structures and to connect said fourth subset of said multipliers to another of said two smaller adder structures, wherein said third subset of said multipliers includes a first group of multipliers from said first and second subsets of said multipliers, and said fourth subset of said multipliers includes a second group of multipliers from said first and second subsets of said multipliers; and configuring said second set of controllable elements to connect and disconnect said certain ones of said shifted partial products to support two separate binary Karatsuba decompositions of two multiplication operations;

wherein:
said third subset of said multipliers and said one of said two smaller adder structures performs a first one of said binary Karatsuba decompositions for a first multiplication operation; and said fourth subset of said multipliers and said another of said two smaller adder structures performs a second one of said binary Karatsuba decompositions for a second multiplication operation.

12. The method of claim 9 further comprising, when said third controllable element is configured to split said joint adder structure into said two smaller adder structures, configuring said first set of controllable elements to select said additional inputs for input to said one of said multipliers and for input to said some of said pre-adders.

13. The method of claim 9 further comprising providing in said joint adder structure two identical but offset patterns for aligning and combining said shifted partial product outputs of said multipliers.

14. The method of claim 13 further comprising, when said third controllable element is configured to maintain said joint adder structure as one adder structure, wherein said joint adder structure comprises a compressor that compresses combined shifted partial product outputs of said multipliers to provide compressed vectors, and said joint adder structure further comprises first and second carry-propagate adders:

configuring said first set of controllable elements to select said outputs of said some of said pre-adders for input to said one of said multipliers, and to select said some of said block inputs for input to said some of said pre-adders;

configuring a first less significant group of bits of each of said compressed vectors as inputs to one of said first and second carry-propagate adders;

configuring a second more significant group of bits of each of said compressed vectors as inputs to another of said first and second carry-propagate adders; and configuring said third controllable element to connect, as a carry input to said another of said first and second carry-propagate adders, a bit from said one of said first and second carry-propagate adders corresponding to a most significant bit of said first less significant group of bits.

15. The method of claim 9 further comprising:
extending at least one of said multipliers by 1 bit in each dimension beyond said first size.

16. A non-transitory machine-readable storage medium encoded with instructions for performing a method of configuring a programmable integrated circuit device to performing multiplication operations, said programmable integrated circuit device including a specialized processing block, said specialized processing block comprising:
- a first number of multiplier circuits of a first size,
- a second number of pre-adders,
- a third number of block inputs, respective pairs of said block inputs being connected to respective ones of a first subset of said multiplier circuits, said respective pairs of said block inputs also being combined in said pre-adders and then input to a second subset of said multiplier circuits,
- a fourth number of additional inputs,
- a first set of controllable elements that controllably select between said additional inputs, and outputs of some of said pre-adders, for input to one of said multipliers, and that controllably select between said additional inputs, and some of said block inputs, for input to some of said pre-adders,
- a plurality of shifters so that partial product outputs of each of said multipliers are shifted by one or more shift amounts to provide one or more shifted partial product outputs from each of said multipliers,
- a joint adder structure for combining said shifted partial product outputs of said multipliers,
- a second set of controllable elements that controllably connect and disconnect certain ones of said shifted partial products to or from said joint adder structure, and
- a third controllable element for selectively splitting said joint adder structure into two smaller compressor and adder structures, said instructions comprising:
- instructions to configure said first and second sets of controllable elements and said third controllable element to select between operation of said specialized processing block as a single block with said first number of multipliers to support one ternary Karatsuba decomposition of one multiplication operation, and operation of said specialized processing block as two sub-blocks each having a respective third or fourth subset of said multipliers including half said first number of multipliers, to support two separate binary Karatsuba decompositions of two multiplication operations.

17. The non-transitory machine-readable storage medium of claim 16 wherein:
- said first number is six;
- each of said third and fourth subsets of said multipliers includes three of said multipliers;
- said ternary Karatsuba decomposition performs a multiplication operation that requires nine of said multipliers in the absence of ternary Karatsuba decomposition; and
- each respective one of said first and second binary Karatsuba decompositions performs a respective multiplication operation that requires four of said multipliers in the absence of binary Karatsuba decomposition.

18. The non-transitory machine-readable storage medium of claim 17 wherein, when said instructions comprise instructions to configure said third controllable element to split said joint adder structure into said two smaller adder structures, said instructions further comprise:
- instructions to configure said first set of controllable elements to connect said third subset of said multipliers to one of said two smaller adder structures and to connect said fourth subset of said multipliers to another of said two smaller adder structures, wherein said third subset of said multipliers includes a first group of multipliers from said first and second subsets of said multipliers, and said fourth subset of said multipliers includes a second group of multipliers from said first and second subsets of said multipliers; and
- instructions to configure said second set of controllable elements to connect and disconnect said certain ones of said shifted partial products to support two separate binary Karatsuba decompositions of two multiplication operations; wherein:
- said third subset of said multipliers and said one of said two smaller adder structures performs a first one of said binary Karatsuba decompositions for a first multiplication operation; and
- said fourth subset of said multipliers and said another of said two smaller adder structures performs a second one of said binary Karatsuba decompositions for a second multiplication operation.

19. The non-transitory machine-readable storage medium of claim 16 wherein:
- when said instructions comprise instructions to configure said third controllable element to split said joint adder structure into said two smaller adder structures, said instructions further comprise instructions to configure said first set of controllable elements to select said additional inputs for input to said one of said multipliers and for input to said some of said pre-adders.

20. The non-transitory machine-readable storage medium of claim 16 wherein, when said instructions comprise instructions to configure said third controllable element to maintain said joint adder structure as one adder structure, wherein said joint adder structure comprises a compressor that compresses combined shifted partial product outputs of said multipliers to provide compressed vectors, and said joint adder structure further comprises first and second carry-propagate adders and provides two identical but offset patterns for aligning and combining said shifted partial product outputs of said multipliers, said instructions further comprise:
- instructions to configure said first set of controllable elements to select said outputs of said some of said pre-adders for input to said one of said multipliers, and to select said some of said block inputs for input to said some of said pre-adders;
- instructions to configure a first less significant group of bits of each of said compressed vectors as inputs to one of said first and second carry-propagate adders;
- instructions to configure a second more significant group of bits of each of said compressed vectors as inputs to another of said first and second carry-propagate adders; and
- instructions to configure said third controllable element to connect, as a carry input to said another of said first and second carry-propagate adders, a bit from said one of said first and second carry-propagate adders corresponding to a most significant bit of said first less significant group of bits.

21. The non-transitory machine-readable storage medium of claim 16 wherein said instructions further comprise instructions to extend at least one of said multipliers by 1 bit in each dimension beyond said first size.

* * * * *